US009178779B2

(12) United States Patent  
Tateishi et al.

(10) Patent No.: US 9,178,779 B2  
(45) Date of Patent: Nov. 3, 2015

(54) SYSTEM FOR DETECTING WHETHER CLIENT STATE MATCHES PREDETERMINED STATE

(71) Applicant: International Business Machines Corporation, Armonk, NY (US)

(72) Inventors: Takaaki Tateishi, Tokyo (JP); Yuji Watanabe, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 402 days.

(21) Appl. No.: 13/707,705

(22) Filed: Dec. 7, 2012

(65) Prior Publication Data

US 2013/0173787 A1    Jul. 4, 2013

(30) Foreign Application Priority Data

Dec. 16, 2011  (JP) ................. 2011-276198

(51) Int. Cl.
  *G06F 15/173* (2006.01)
  *H04L 12/26* (2006.01)
  *H04L 9/00* (2006.01)

(52) U.S. Cl.
  CPC ........... *H04L 43/00* (2013.01); *H04L 9/008* (2013.01); *H04L 43/0817* (2013.01)

(58) Field of Classification Search
  USPC ............. 709/224, 220, 223, 248; 705/51, 3
  See application file for complete search history.

(56) References Cited

U.S. PATENT DOCUMENTS

| | | | |
|---|---|---|---|
| 5,596,632 A * | 1/1997 | Curtis et al. | 379/189 |
| 6,374,267 B1 * | 4/2002 | Tam | 1/1 |
| 6,411,969 B1 * | 6/2002 | Tam | 1/1 |
| 8,601,108 B1 * | 12/2013 | Zhang et al. | 709/223 |
| 2002/0035485 A1 * | 3/2002 | Mita et al. | 705/2 |
| 2002/0178031 A1 * | 11/2002 | Sorensen et al. | 705/2 |
| 2004/0044628 A1 * | 3/2004 | Mathew et al. | 705/51 |
| 2004/0172305 A1 * | 9/2004 | Soerensen et al. | 705/3 |
| 2005/0193201 A1 * | 9/2005 | Rahman et al. | 713/169 |
| 2006/0235626 A1 * | 10/2006 | Stewart et al. | 702/20 |
| 2009/0177800 A1 * | 7/2009 | Gidron et al. | 709/248 |
| 2012/0307287 A1 * | 12/2012 | Motosugi | 358/1.14 |

FOREIGN PATENT DOCUMENTS

JP    2004-334362 A    11/2004

OTHER PUBLICATIONS

Michael J. Freedman, Kobbi Nissim and Benny Pinkas, "Eff Priv Matching and Set Intersection", Advances in Cryptology EUROCRYPT 2004, Lecture Notes in Computer Science 2004.

* cited by examiner

*Primary Examiner* — Tammy Nguyen  
(74) *Attorney, Agent, or Firm* — Harrington & Smith

(57) ABSTRACT

A server connectable to a client able to manage successively transitioned-to states. The server has a set storage unit for storing a set including a predetermined state; a server-side communication unit for communicating with the client using a privacy-preserving set-intersection protocol for detecting whether an element in a mutual set is a common element between mutual sets while preserving privacy; and a determining unit for determining whether the state of the client is included in the set stored by the set storage unit on the basis of ciphertext received in accordance with the privacy-preserving set-intersection protocol. Also provided is an information processing method which is able to manage successively transitioned-to-states.

20 Claims, 16 Drawing Sheets

| Previous State \ Character | $x_0$ | $x_1$ | $x_2$ | ... | $x_\sigma$ | ... | $x_{|\Sigma|-1}$ |
|---|---|---|---|---|---|---|---|
| $q_0$ | ... | ... | ... | ... | ... | ... | ... |
| $q_1$ | ... | ... | ... | ... | ... | ... | ... |
| $q_2$ | ... | ... | ... | ... | ... | ... | ... |
| ... | ... | ... | ... | ... | ... | ... | ... |
| $q_i$ | ... | ... | ... | ... | $q_j$ | ... | ... |
| ... | ... | ... | ... | ... | ... | ... | ... |
| $q_{|Q|-1}$ | ... | ... | ... | ... | ... | ... | ... |

Subsequent State

FIG. 12

Previous State Keys For Entered Characters

| Previous State | Previous State Key |
|---|---|
| $q_0$ | $S_0$ |
| $q_1$ | $S_1$ |
| $q_2$ | $S_2$ |
| ⋮ | ⋮ |
| $q_i$ | $S_i$ |
| ⋮ | ⋮ |
| $q_{|Q|-1}$ | $S_{|Q|-1}$ |

FIG. 13

Subsequent State Key For Entered Characters

| Subsequent State | Subsequent State Key |
|---|---|
| $q_0$ | $r_0$ |
| $q_1$ | $r_1$ |
| $q_2$ | $r_2$ |
| ⋮ | ⋮ |
| $q_j$ | $r_j$ |
| ⋮ | ⋮ |
| $q_{|Q|-1}$ | $r_{|Q|-1}$ |

FIG. 14

SYSTEM FOR DETECTING WHETHER CLIENT STATE MATCHES PREDETERMINED STATE

CROSS-REFERENCE TO RELATED APPLICATION

This application claims priority under 35 U.S.C. §119 from Japanese Patent Application No. 2011-276198 filed Dec. 16, 2011, the entire contents of which are incorporated herein by reference.

BACKGROUND OF THE INVENTION

1. Field of the Invention

The present invention relates to a system, server, client, method, and program for detecting whether or not the state of a client matches a predetermined state stored in a server.

2. Description of the Related Art

There are systems in which a server monitors the state of a client, and generates a warning when the state is not in a predetermined state. In this case, the server has to periodically acquire the state of the client, and determine whether or not the state of the client is the predetermined state.

However, when a server periodically acquires and monitors the state of a client, there is a possibility that the state to which the client is transitioning can be estimated on the server side.

Also, there is a method for checking whether or not a string possessed by a client has been accepted by an automaton possessed by a server which is called oblivious automaton evaluation. Oblivious automaton evaluation is a method where the checking process is executed without disclosing the string possessed by the client to the server and without disclosing the automaton possessed by the server to the client. Because the state of the client is oblivious to the server when this checking method is used, the state of the client is not estimated.

However, in oblivious automaton evaluation, the checking process has to be executed each time by returning the automaton to its initial state and transitioning in successive order through the states of the automaton. Therefore, when the state of the client is periodically monitored, the amount of transitioning (processing) increases as time elapses and the processing burden is more substantial.

SUMMARY OF INVENTION

The first aspect of the present invention a server is connectable to a client which is able to manage successively transitioned-to states, where the server has a set storage unit for storing a set including a predetermined state, a server-side communication unit for communicating with the client using a privacy-preserving set-intersection protocol for detecting whether an element in a mutual set is a common element between mutual sets while preserving privacy, and a determining unit for determining whether the state of the client is included in the set stored by the set storage unit on the basis of ciphertext received in accordance with the privacy-preserving set-intersection protocol. Also provided is an information processing method and program for this server.

In another aspect of the present invention a server is connectable to a client able to manage successively transitioned-to states, where the server has a set storage unit for storing a set including a predetermined state, and a server-side communication unit for communicating with the client using a privacy-preserving set-intersection protocol for detecting whether an element in a mutual set is a common element between mutual sets while preserving privacy; the server-side communication unit further contains sending ciphertext in accordance with the privacy-preserving set-intersection protocol in order for a determining unit in the client to determine whether the state of the client is included in the set stored by the set storage unit. Also provided is an information processing method and program for this server.

In another aspect of the present invention a client is connectable to a server storing a set including a predetermined state, in which the client has a state management unit for managing the successively transitioning state of the client, a client-side communication unit for communicating with the server using a privacy-preserving set-intersection protocol for detecting whether an element in a mutual set is a common element between mutual sets while preserving privacy, and a determining unit for determining whether the state of the client is included in the set stored by the set storage unit on the basis of ciphertext received from the server in accordance with the privacy-preserving set-intersection protocol.

In another aspect of the present invention a client is connectable to a server storing a set including a predetermined state, in which the client has: a state management unit for managing the successively transitioning state of the client, and a client-side communication unit for communicating with the server using a privacy-preserving set-intersection protocol for detecting whether an element in a mutual set is a common element between mutual sets while preserving privacy; the client-side communication unit further includes sending ciphertext in accordance with the privacy-preserving set-intersection protocol in order to determine whether the state of the client is included in the set stored by the set storage unit.

It should be noted that the above summary of the present invention is not intended to enumerate all of the features required of the present invention. In addition, sub-combinations of these groups of characteristics also constitute the present invention.

BRIEF DESCRIPTION OF DRAWINGS

Features, advantages, and other aspects of various embodiments of the present invention will become more apparent from the following detailed description, when taken in conjunction with the figures illustrate several embodiments of the present invention in an exemplary rather than limiting manner.

FIG. 12 is an example of a transition table for an automaton possessed by the server in an embodiment of the present invention.

FIG. 13 is a key table for previous state keys corresponding to the previous states when a given character was inputted.

FIG. 14 is a key table for subsequent state keys corresponding to the subsequent states when a given character was inputted.

DETAILED DESCRIPTION OF THE PREFERRED EMBODIMENT

Various embodiments of the present invention are described in detail below with reference to the figures. The following is an explanation of the present invention. However, all combinations of characteristics explained in the present invention are not necessarily required in the technical solution.

Figure 1:
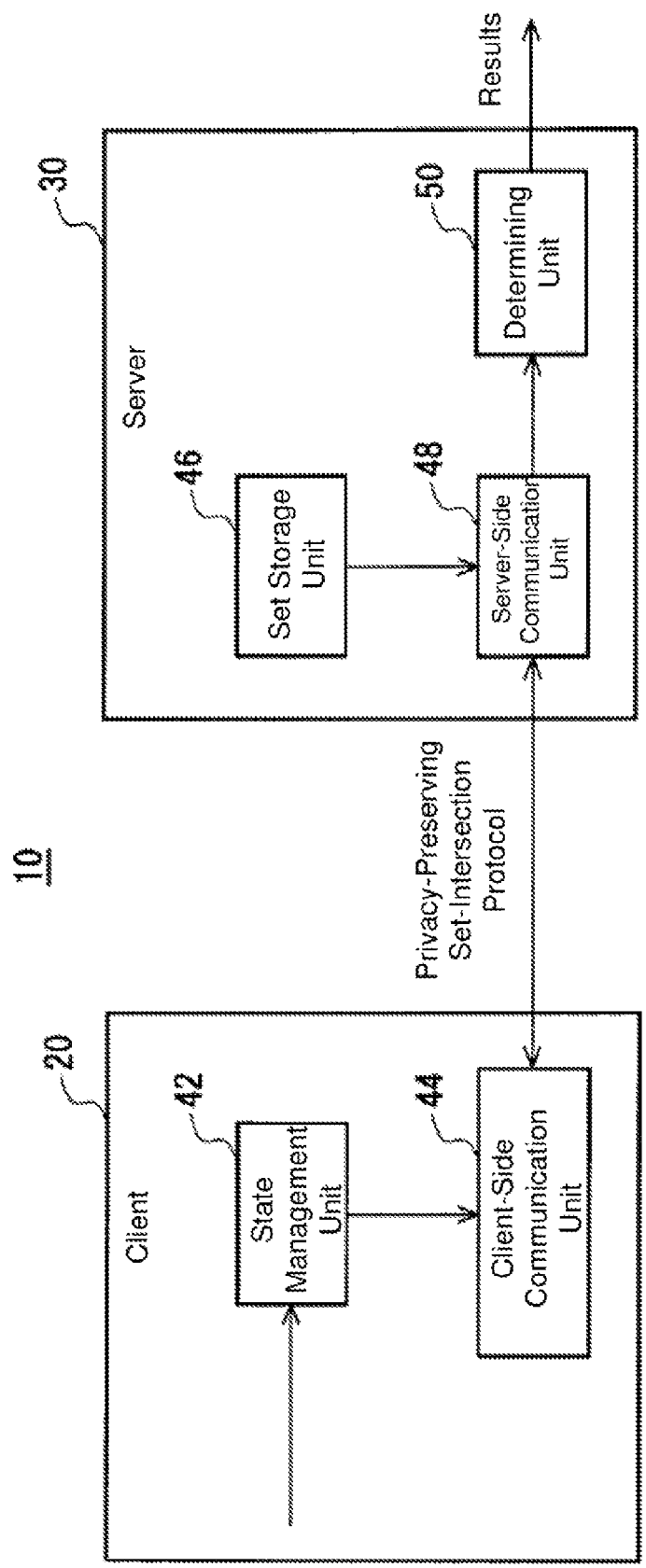
FIG. 1 is a schematic diagram showing a functional block diagram of the detection system in an embodiment of the present invention.

FIG. 1 shows a function block diagram of detection system 10 in one aspect of the present invention. The detection system 10 in the present embodiment includes a client 20 and a server 30.

In detection system 10, the successively transitioning state of client 20 is periodically detected to determine whether it matches a predetermined state stored by server 30. In this case, detection system 10 executes the detection process without identifying the state of client 20 to server 30, and without identifying the predetermined state stored by server 30 to client 20.

Client 20 includes a state management unit 42, a client-side communication unit 44, a set storage unit 46, a server-side communication unit 48, and a determining unit 50.

State management unit 42 of client 20 manages the successively transitioning state of client 20. State management unit 42 transitions the state of client 20 in response to the occurrence of an event. State management unit 42, for example, has an automaton, and the state of the automaton is transitioned in response to various events occurring in client 20.

For example, if client 20 is a device for managing financial transactions, state management unit 42 acquires an event such as a withdrawal, deposit or account transfer, and the state of client 20 is transitioned in response to the acquired event. Also, state management unit 42 acquires characters inputted by a user (for example, a password) as an event, transitions the state of the automaton in response to the acquired characters, and detects whether or not the inputted string is acceptable to the automaton (whether or not the password is correct).

Also, state management unit 42 can execute the state transition process in another device (for example, server 30) which possesses the automaton, and acquire the detection results from the other device. In this case, state management unit 42 acquires the state of client 20 from the other device via a protocol (oblivious automaton evaluation protocol) which preserves the privacy of the content of the event that has occurred (for example, a string) with respect to the other device and which preserves the privacy of the content of the automaton possessed by the other device with respect to client 20. In this case, state management unit 42 can acquire, as a value representing the state, a privacy-preserving state value (for example, a random number or encrypted value generated by server 30) which preserves privacy with respect to client 20. An example of state management unit 42 managing a privacy-preserving state value as the state of client 20 will be explained in greater detail below.

Set storage unit 46 of server 30 stores a set including a plurality of predetermined states. For example, if client 20 is a device for managing financial transactions, state management unit 42 stores a set including a state transitioned to when the transfer process has been performed a predetermined number of times to a specific account (for example, a "black account") within a predetermined period of time, and a state transitioned to when the payment process indicates a specific behavior deemed to be an unauthorized behavior. Also, state management unit 42 can store a set including a state transitioned to when the password has been mistakenly entered a predetermined number of times.

Determining unit 50 communicates with the client-side communication unit 44 and server-side communication unit 48 to determine whether the state of client 20 is included in the set stored by set storage unit 46 of server 30. For example, determining unit 50 can detect the occurrence of an abnormality in client 20 when the state of client 20 is included in the set stored by set storage unit 46 of server 30. Conversely, determining unit 50 can detect the occurrence of an abnormality in client 20 when the state of client 20 is not included in the set stored by set storage unit 46 of server 30.

Client-side communication unit 44 of client 20 communicates with server-side communication unit 48 via a network. Server-side communication unit 48 of server 30 communicates with client-side communication unit 44 of client 20 via the network.

Client-side communication unit 44 and server-side communication unit 48 communicate with each other via the privacy-preserving set-intersection protocol to detect whether an element in a mutual set is a common element between mutual sets while preserving privacy. The privacy-preserving set-intersection protocol is described in Freedman et al., "Efficient Private Matching and Set Intersection", Advances in Cryptology, Eurocrypt 2004, Lecture Notes in Computer Science 2004. The details of the communication processing using the privacy-preserving set-intersection protocol will be explained in further detail below.

Figure 2:
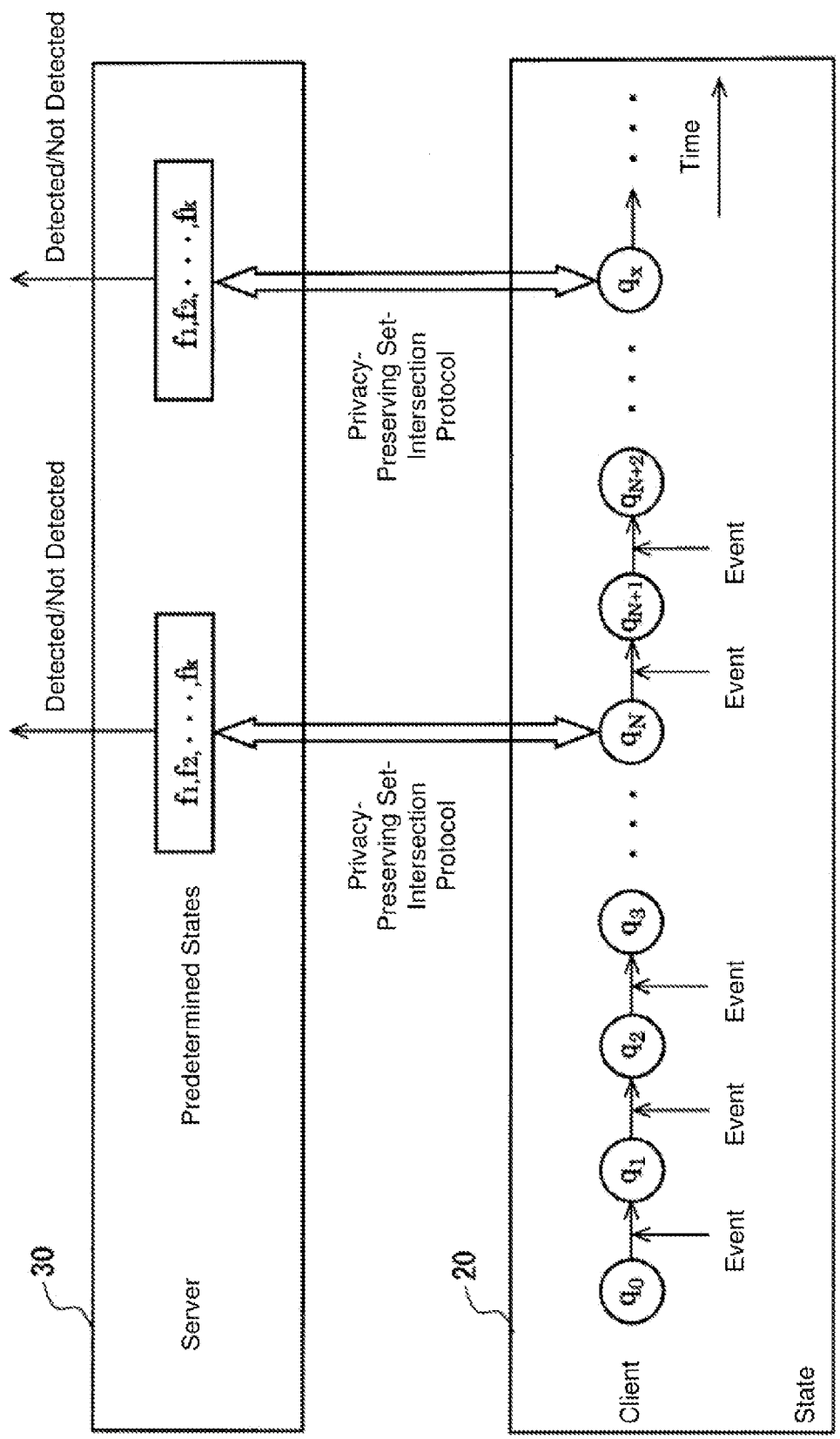
FIG. 2 is a schematic diagram showing the timing for determining whether or not the state of the client matches any of the states included in the set stored in the server in an embodiment of the present invention.

FIG. 2 shows the timing for determining whether or not the state of client 20 matches any of the states included in the set stored in server 30. Client 20 transitions the state in response to the occurrence of an event. For example, as shown in FIG. 2, the state of client 20 transitions in successive order $q0 \rightarrow q1 \rightarrow q2 \rightarrow \ldots qN$, where $q0$ is the initial state. Then, determining unit 50 of server 30 determines, for example, on a predetermined timing, whether the state of client 20 is included in a set stored by set storage unit 46 of server 30. For example, as shown in FIG. 2, determining unit 50 determines on a predetermined timing whether state "qN" of client 20 in the timing matches any of a predetermined number of states "f1, f2, f3, . . . , fk".

Also, after it has been determined whether the state of client 20 is included in the set, the state of client 20 continues to transition. For example, as shown in FIG. 2, client 20 transitions states in successive order from qN as indicated by qN+1→qN+2→qN+3→ . . . qX. Determining unit 20, after determining that the state of client 20 is included in the set, again determines using the privacy-preserving set-intersection protocol whether the state of client 20 is included in the set once there has been at least one transition in the state of client 20. For example, as shown in FIG. 2, determining unit 50 determines, once a predetermined period of time has elapsed since the previous determination, whether state "qX" of client 20 matches any of a predetermined plurality of states "f1, f2, f3, . . . , fk".

Afterwards, the state of client 20 continues to transition as time passes. Then, determining unit 50 repeats the process every time a predetermined amount of time elapses, to determine using the privacy-preserving set-intersection protocol whether the state of client 20 is included in the set stored in server 30.

As a result, determining unit 50 can determine whether the state of server 20 matches any of the plurality of states included in the set stored by server 30 while preserving the privacy of the state of client 20 from server 30 and preserving the privacy of the state stored by server 30 from client 20. Also, determining unit 50 can determine whether the state of server 20 matches any of the plurality of states included in the set stored by server 30 without increasing the amount of processing, even when the state of client 20 has transitioned.

Figure 3:
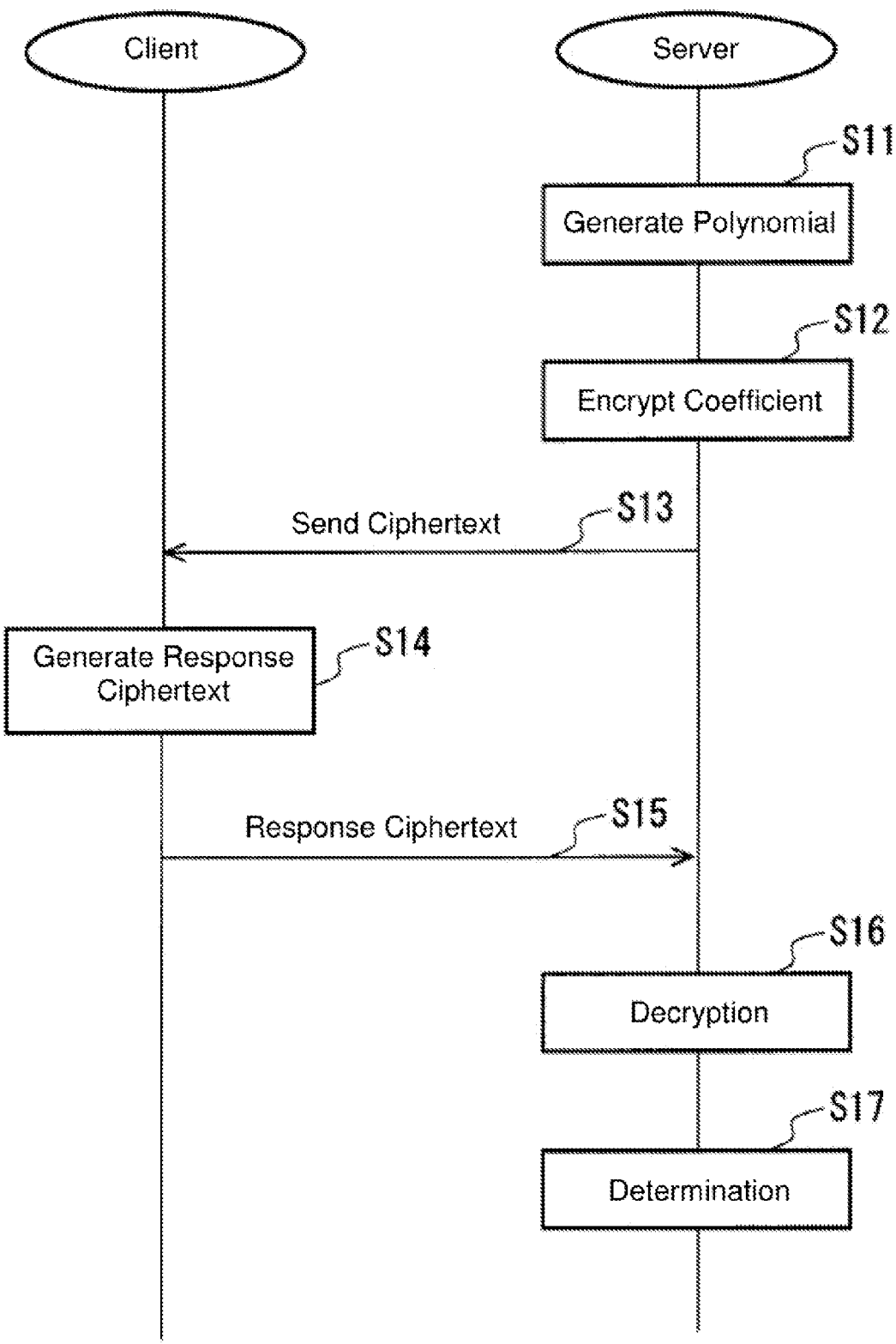
FIG. 3 is a schematic diagram showing an example of the communication process performed using the privacy-preserving set-intersection protocol in the detection system in an embodiment of the present invention.

FIG. 3 shows an example of the communication process performed using the privacy-preserving set-intersection protocol in detection system 10 of an aspect of the present invention. Client 20 and server 30 execute the processing from Step S11 to Step S17 described below when it is to be determined using the privacy-preserving set-intersection protocol whether the state of client 20 is included in a set stored by server 30.

Values such as those shown in Equation 1 below are stored beforehand in server 30 as values representing a plurality of states included in a set.

$$f_1, f_2, f_3, \ldots, f_k \qquad \text{Equation 1}$$

First, in Step S11, server 30 generates a polynomial P(x). The polynomial P(x) is a function which becomes zero when any value representing the plurality of states included in the set stored by server 30 is assigned to variable x. In other words, server 30 generates polynomial P(x) which uses any value representing the plurality of states included in the set to solve variable x.

$$P(x) = (x - f_1)(x - f_2)(x - f_3) \ldots (x - f_k) \qquad \text{Equation 2}$$
$$= 1_k \cdot x^k + 1_{k-1} \cdot x^{k-1} + \ldots + 1_1 x + 1_0$$

Next, in Step S12, server 30, as shown in Equation 3 below, generates sent ciphertext in which all of the coefficients in the polynomial P(x) are encrypted using an encryption scheme with homomorphism (for example, additive homomorphism). For example, server 30 encrypts each coefficient using enhanced ElGamal encryption.

$$E(1_k)$$
$$E(1_{k-1})$$
$$E(1_{k-2})$$
$$\vdots$$
$$E(1_1)$$
$$E(1_0)$$

Equation 3

Here, the ciphertext encrypted using an encryption scheme with additive homomorphism has the characteristics shown in Equation 4 below. In this equation, m1, m2 and m represent plain text.

$$E(m_1) \cdot E(m_2) = E(m_1 + m_2)$$
$$\{E(m)\}^x = E(m \cdot x) \qquad \text{Equation 4}$$

When two ciphertexts E(m1), E(m2) are provided in an encryption scheme with additive homomorphism, the result of adding the ciphertexts together (E(m1)·E(m2)) is the same as ciphertext encrypted after the plain text has been added together (E(m1+m2)). Also, the result of raising the ciphertext to the power of numerical value k ($(E(m))^k$) is the same as ciphertext encrypted after raising plaintext to the power of numerical value k (E(k·m)).

Next, in Step S13, server 30 sends the plurality of generated sent ciphertexts to client 20. In this case, server 30 sends each transmitted ciphertext so client 20 can identify them as corresponding to one of the coefficients. Meanwhile, client 20 stores the value representing the state of client 20 (for example, q). When client 20 manages a plurality of states in parallel, the values representing the plurality of states may be stored as shown in Equation 5 below.

$$q_a, q_b, q_c, \qquad \text{Equation 5}$$

In Step S14, client 20 generates response ciphertext E(r·P(q)) using the characteristics of the homomorphic ciphertext shown in Equation 4 from the sent ciphertext received from server 30 and from value q representing the state of client 20. Response ciphertext E(r·P(q)) is obtained by plugging value q representing the state of client 20 into the variable x of polynomial P(x), raising value P(q) representing the result to the power of random number r, and encrypting the product using an encryption scheme having homomorphism. In other words, client 20 raises the value q representing the state of the client 20 to each order of the variable included in the polynomial. Then, client 20 raises the sent ciphertext of the corresponding order shown in Equation 3 by the power of the value representing the state of client 20 raised to the power of the corresponding order. Then, client 20 can generate response ciphertext E(r·P(q)) by additive synthesis of these, and raising the result of the additive synthesis to the power of a random number. Also, in this case, when a plurality of states is managed in parallel by client 20, client 20 generates response ciphertext for the values representing the plurality of states qa, qb, qc, . . . as shown in Equation 6 below. In Equation 6, r1, r2, r3 represent random numbers.

$$E(r_1 \cdot P(q_a))$$
$$E(r_2 \cdot P(q_b))$$
$$E(r_3 \cdot P(q_c)) \qquad \text{Equation 6}$$

In Step S15, client 20 sends the generated response ciphertext to server 30. Next, in Step S16, server 30 decrypts each response ciphertext. In this case, server 30 decrypts the response ciphertext using a decryption key corresponding to the encryption key used in Step S12.

In Step S17, server 30 determines whether or not "0" is included in the results obtained from decrypting any of the response ciphertexts. The solutions to polynomial P(x) are values f1, f2, f3, ..., fk, which represent the plurality of states included in the set stored by server 30. Therefore, when the value qa, qb, qc, etc. representing the state of client 20 plugged into the polynomial P(x) matches any value f1, f2, f3, ..., fk representing the plurality of states included in the set, the decryption result is 0. Conversely, when the value qa, qb, qc, etc. representing the state of client 20 plugged into the polynomial P(x) does not match any value f1, f2, f3, ..., fk representing the plurality of states included in the set, the decryption result is not 0.

Therefore, if the result obtained by decrypting the response ciphertext is 0, server 30 can determine that the state of client 20 is included in the set stored by set storage unit 46 of server 30. Conversely, if the result obtained by decrypting the response ciphertext is not 0, server 30 can determine that the state of client 20 is not included in the set stored by set storage unit 46 of server 30.

In this way, server 30 can determine whether the state of client 20 is included in the set stored by set storage unit 46 in server 30 while preserving the privacy of the state of client 20 from server 30 and while preserving the privacy of the content of the set stored by server 30 from client 20.

Figure 4:
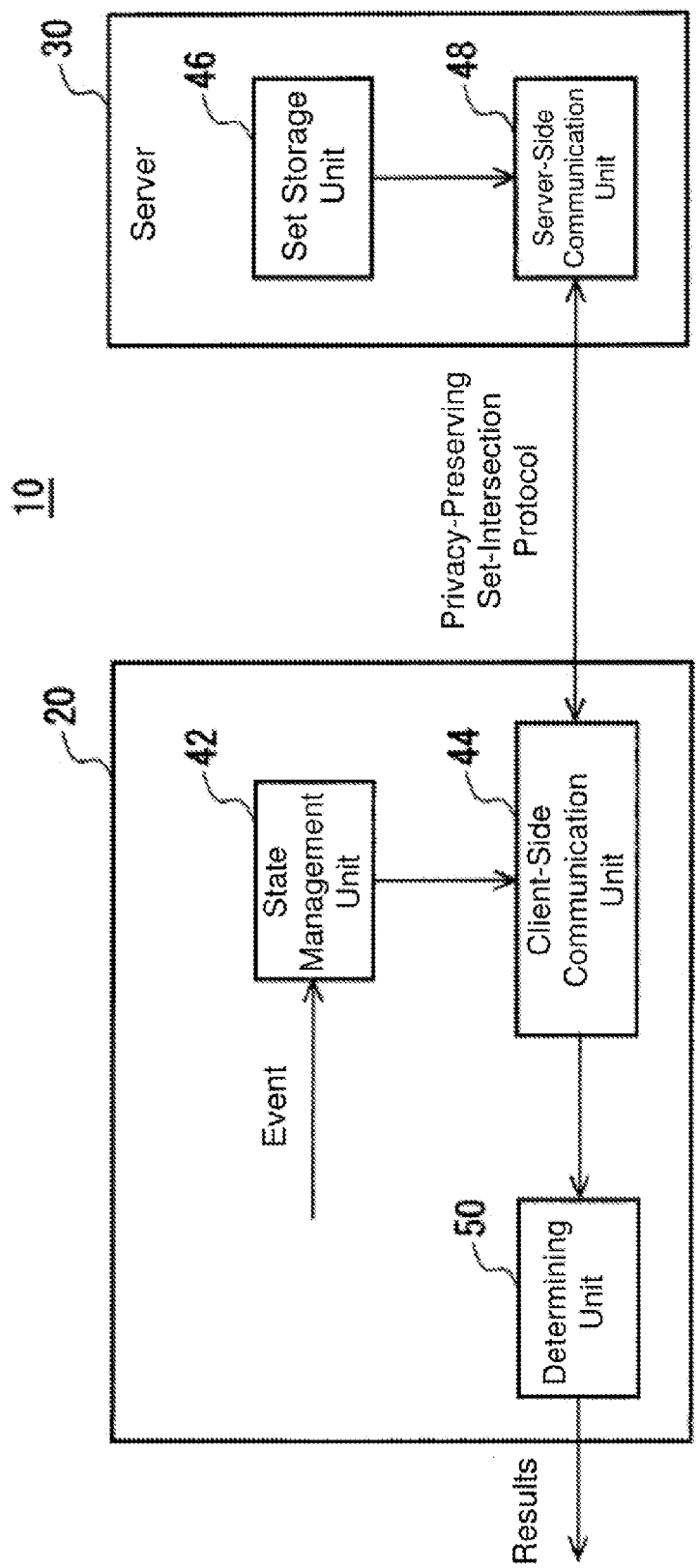
FIG. 4 is a schematic diagram showing a functional block diagram of the detection system in the first embodiment of the present invention.

FIG. 4 shows a function block diagram of detection system 10 in one aspect of the present invention. Detection system 10 in the present aspect has a configuration and functions nearly identical to those of detection system 10 in one aspect of the present invention shown in FIG. 1. Therefore, with the exception of differences, explanation of the functions and configuration in one aspect of the present invention are nearly identical to those shown in FIG. 1 will be omitted.

Client 20 in the present variation also has a determining unit 50. Also, server 30 in one aspect of the present invention does not have a determining unit 50. In other words, in one aspect of the present invention, determining unit 50 is located in client 20 rather than in server 30. In one aspect of the present invention, determining unit 50 outputs to the user of client 20 the results of determining whether the state of client 20 is included in the set stored by set storage unit 46 in server 30.

Figure 5:
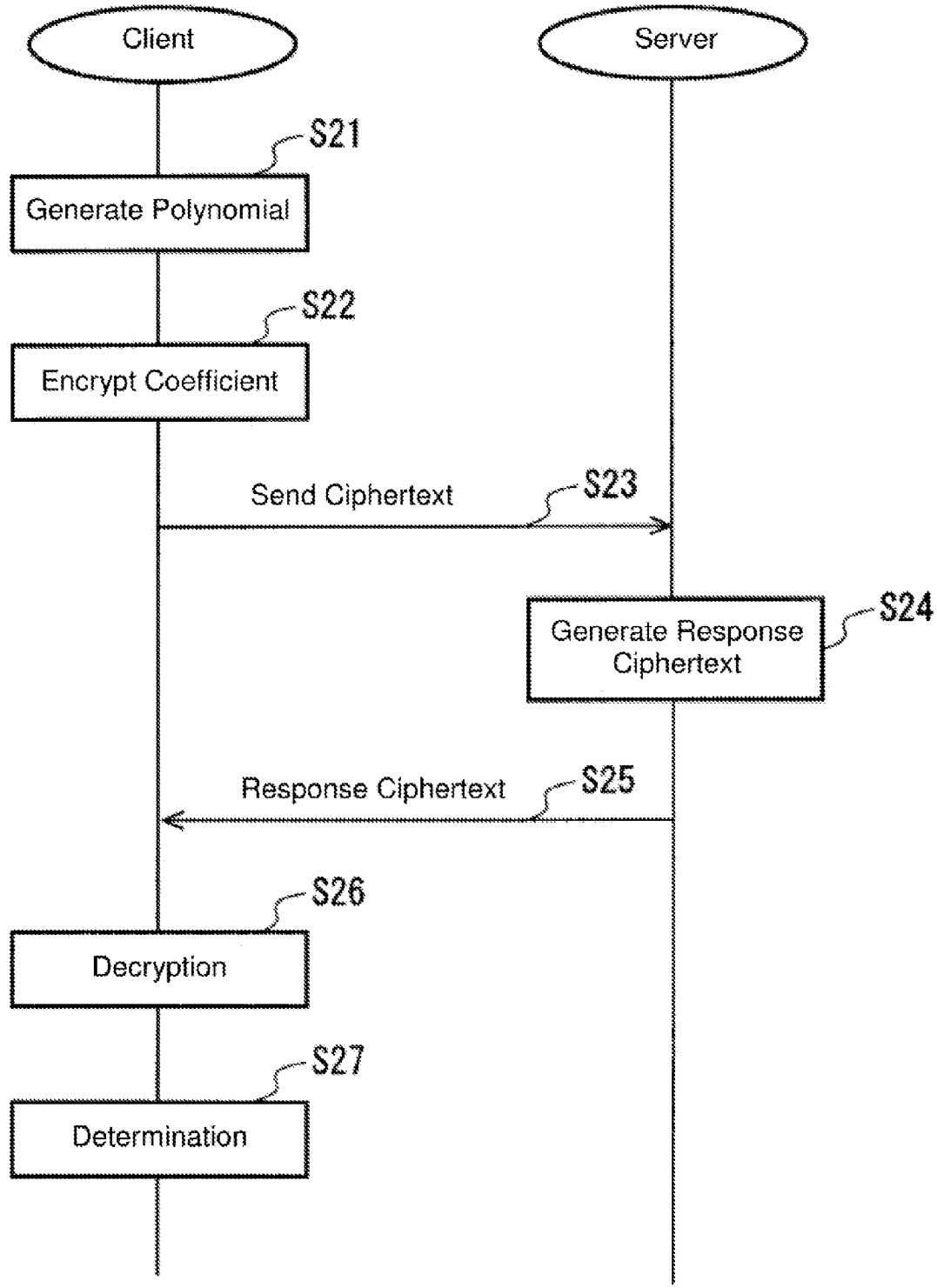
FIG. 5 is an example of the communication process performed using the privacy-preserving set-intersection protocol in the detection system in the first embodiment of the present invention.

FIG. 5 shows an example of the communication process performed in the first aspect of the present invention using the privacy-preserving set-intersection protocol. In one aspect of the present invention, server 30 and client 20 execute the processing from Step S21 to Step S27 described below using the privacy-preserving set-intersection protocol when it is to be determined whether the state of server 30 is included in a set stored by client 20. Client 20 stores values qa, qb, qc, etc. representing a plurality of states. First, in Step S21, client 20 generates polynomial P(x). Polynomial P(x) is a function which becomes 0 when the value qa, qb, qc representing the state of client 20 is substituted for variable x.

In Step S22, client 20 generates a plurality of sent ciphertext in which all of the coefficients in the generated polynomial P(x) are encrypted using an encryption scheme with homomorphism (for example, additive homomorphism). Client 20, for example, encrypts each coefficient using expansion ElGamal encryption.

In Step S23, client 20 sends the regenerated plurality of sent ciphertexts to server 30. In this case, client 20 sends each of the sent ciphertexts so the ciphertext corresponding to the coefficients can be identified by server 30.

Server 30 stores values f1, f2, f3, ..., fk representing the plurality of states included in the set. In Step S24, server 30 generates response ciphertext E(r·P(f)) using the characteristics of the homomorphic ciphertext from the sent ciphertext received from client 20 and from values f1, f2, f3, ..., fk representing the plurality of states included in the set. Response ciphertext E(r·P(f)) is obtained by plugging values f1, f2, f3, ..., fk representing the plurality of states into the variable x of polynomial P(x), raising values P(f1), P(f2), ..., P(fk) representing the result to the power of random number r, and encrypting the product using an encryption scheme having homomorphism.

In Step S25, server 30 sends the generated response ciphertext to client 20. In Step S26, client 20 decrypts the response ciphertext. In this case, client 20 decrypts the response ciphertext using a decryption key corresponding to the encryption key used in Step S22.

Next, in Step S27, client 20 determines whether or not the results of decrypting any of the response ciphertext include "0". If the results of decrypting the response ciphertext include 0, client 20 can determine that the state of server 30 is included in a set stored by set storage unit 46 of client 20. Conversely, if the results of decrypting the response ciphertext do not include 0, client 20 can determine that the state of server 30 is not included in a set stored by set storage unit 46 of client 20.

Client 20 in one aspect of the present invention can determine whether the state of server 30 is included in the set stored by set storage unit 46 of client 20 while preserving the privacy of the plurality of states included in the set stored in server 30 from client 20 and while preserving the privacy of the state of client 20 from server 30.

Figure 6:
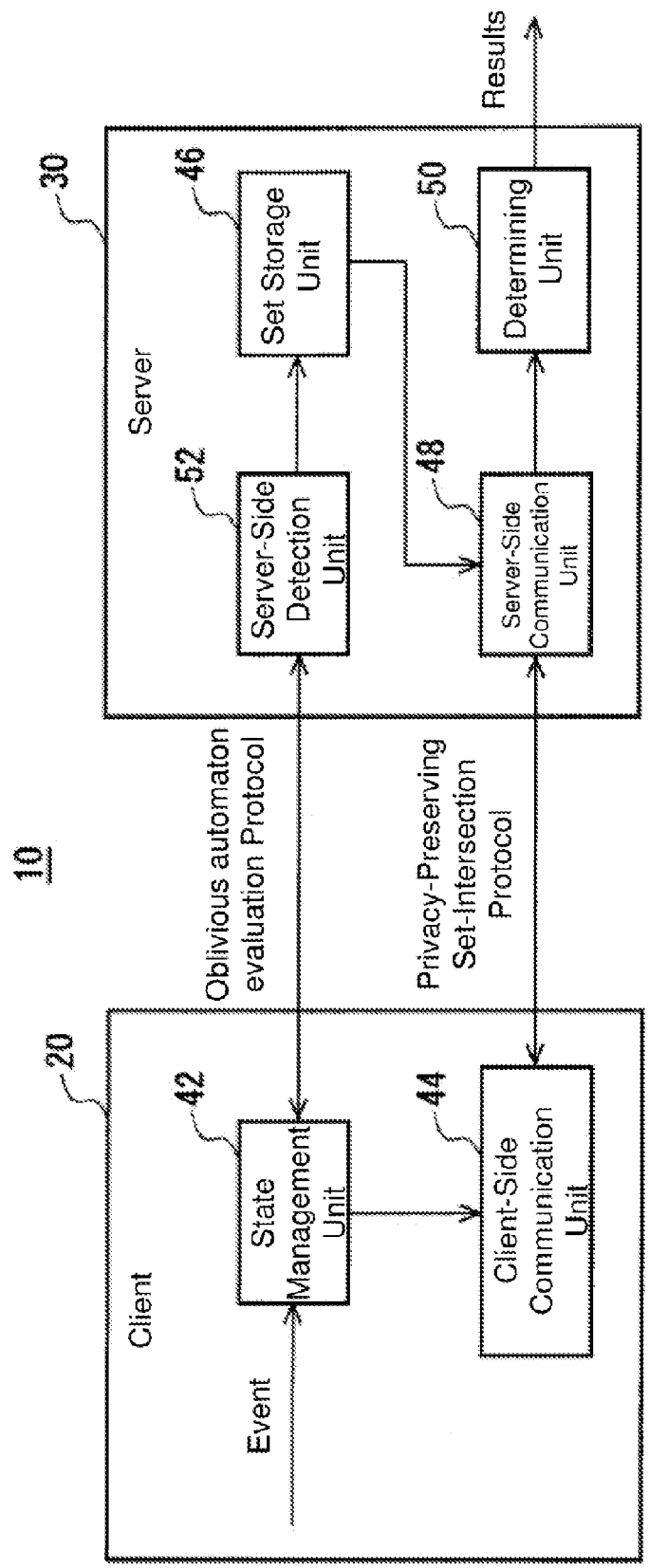
FIG. 6 is a schematic diagram showing a functional block diagram of the detection system in the second embodiment of the present invention.

FIG. 6 shows an example of the communication process performed by detection system 10 in another aspect of the present invention using the privacy-preserving set-intersection protocol. Detection system 10 in one aspect of the present invention has a configuration and functions nearly identical to those of detection system 10 in the aspect of the present invention shown in FIG. 1. Therefore, with the exception of differences, explanation of the functions and configuration of the aspect of the present invention that are nearly identical to those shown in FIG. 1 will be omitted. The aspect of the present invention can also be applied to detection system 10 of the first aspect of the present invention shown in FIG. 4.

Server 30 in an aspect of the present invention also has a server-side detection unit 52. State management unit 42 in an aspect of the present invention has input generated in client 20. Server-side detection unit 52 possesses an automaton whose state transitions in response to an event received by state management unit 42.

State management unit 42 and server-side detection unit 52 allow state management unit 42 to acquire the state of client 20 using a protocol (oblivious automaton evaluation protocol) which preserves the privacy of the content of the occurring event from server 30 and which preserves the privacy of the automaton possessed by server 30 from client 20. The privacy-preserving state value representing the state transitioned to in response to the inputted event is acquired from server-side detection unit 52. This preserved-privacy state value is a value whose privacy is preserved from client 20. More specifically, the privacy-preserving state value is a random number generated by server 30. Therefore, client 20 cannot pretend to use the random number privacy-preserving state value by arbitrarily adding changes and using another state.

Also, server-side detection unit 52 communicates with state management unit 42 using the oblivious automaton evaluation protocol and transitions state of automaton in response to event inputted by state management unit 42 without disclosing automaton to client 20. Then, server-side detection unit 52 sends to state management unit 42 using the oblivious automaton evaluation protocol a privacy-protecting state value corresponding to the state transitioned to.

Also, in an aspect of the present invention, state management unit 42 manages the acquired privacy-preserving state value as the state of the client. Also, in an aspect of the present invention, set storage unit 46 stores a set including the privacy-preserving state values corresponding to some of the predetermined states among the privacy-preserving state values corresponding to the states of automaton.

In one aspect of the present invention client-side communication unit 44 and server-side communication unit 48 use privacy-preserving set-intersection protocol to detect a match between privacy-preserving state value acquired by state management unit 42 and the set including privacy-preserving state values stored by set storage unit 46. Server 30 in an aspect of the present invention can determine whether the state of client 20 is included in the set stored by set storage unit 46 of server 30 while preserving the privacy of state of client 20 from server 30 and while preserving privacy of set stored by server 30 from client 20.

The following is an explanation of an example of an oblivious automaton evaluation protocol with reference to FIG. 7 through FIG. 16.

Figure 7:
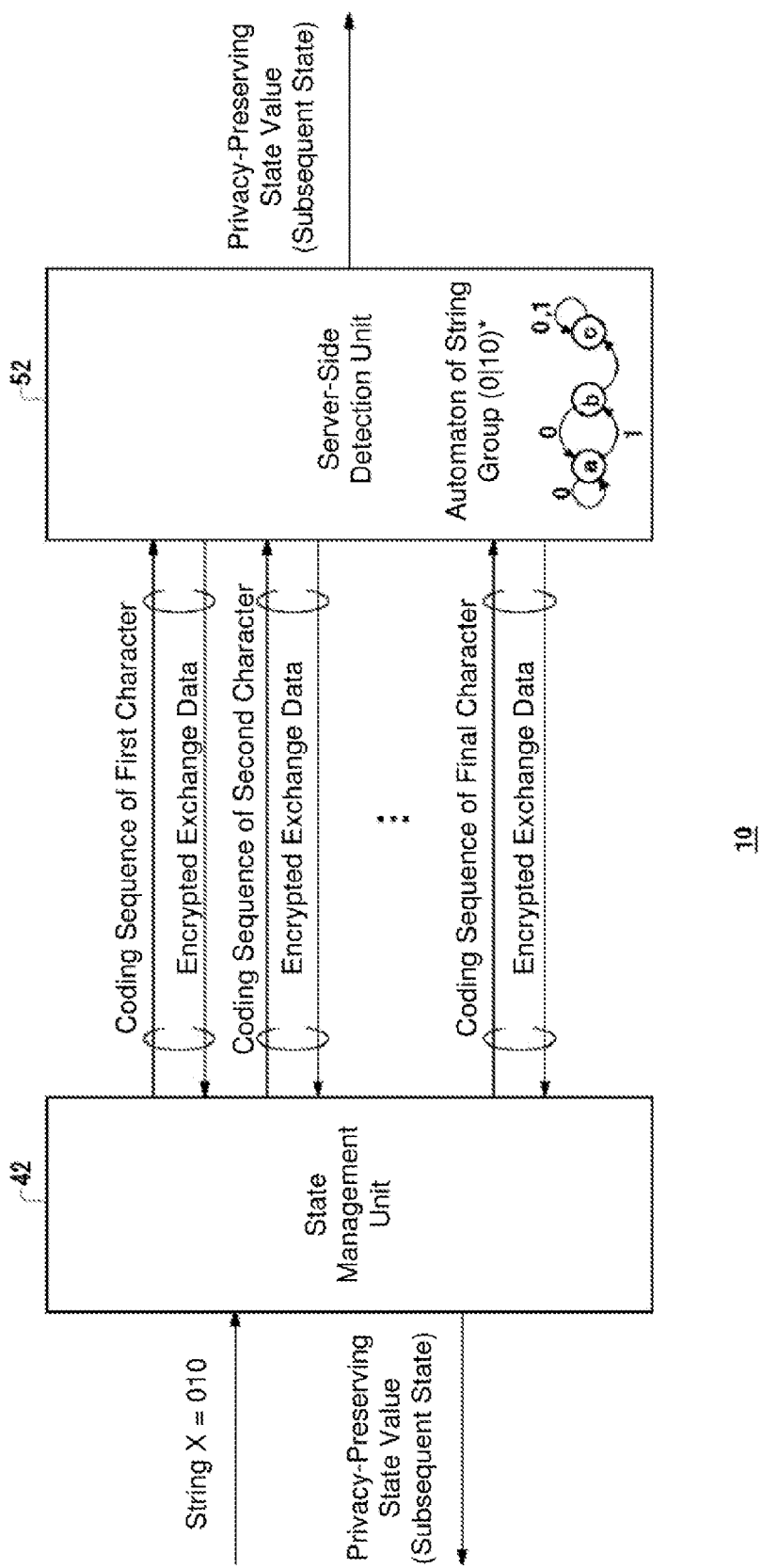
FIG. 7 is the state management unit and the server-side detection unit in an embodiment of the present invention.

FIG. 7 shows state management unit 42 and server-side detection unit 52 in an aspect of the present invention. Detection system 10 in an aspect of the present invention inputs a string as an event. In detection system 10, automaton possessed by server-side detection unit 52 of server 30 transitions in response to string inputted to state management unit 42 of client 20. Detection system 10 outputs as state of client 20 a privacy-preserving state value representing which state automaton has transitioned to.

State management unit 42 inputs a string from an external unit. The characters included in the string can be any type of character. For example, they can be binary values with "0" and "1", or characters represented by a single byte.

Server-side detection unit 52 has an automaton which undergoes a state transition in response to a received character. The character received by the automaton is the character inputted to state management unit 42. Automaton represents regular expression of a set of strings (group of strings) registered beforehand. Automaton receives each character in a string in successive order from the beginning, and transitions to a state in successive order for each character from the first character.

State management unit 42 generates a coding sequence corresponding to each inputted character, and sends a coding sequence to server-side detection unit 52 for each inputted character in the string. A coding sequence is explained in greater detail below.

In response to receiving a coding sequence from state management unit 42, server-side detection unit 52 generates and returns to state management unit 42 encrypted exchange data. Exchange data is explained in greater detail below. State management unit 42 and server-side detection unit 52 exchange coding sequences and encrypted exchange data for every inputted character in the string.

Beginning with the first character, state management unit 42 successively decrypts encrypted exchange data received for each character. When exchange data for the final character has been decrypted, state management unit 42 can acquire the subsequent state key indicating which state automaton has transitioned to. State management unit 42 then outputs acquired subsequent state key as \ privacy-preserving state value presenting the state of client 20. Subsequent state key will be explained in greater detail below.

Figure 8:
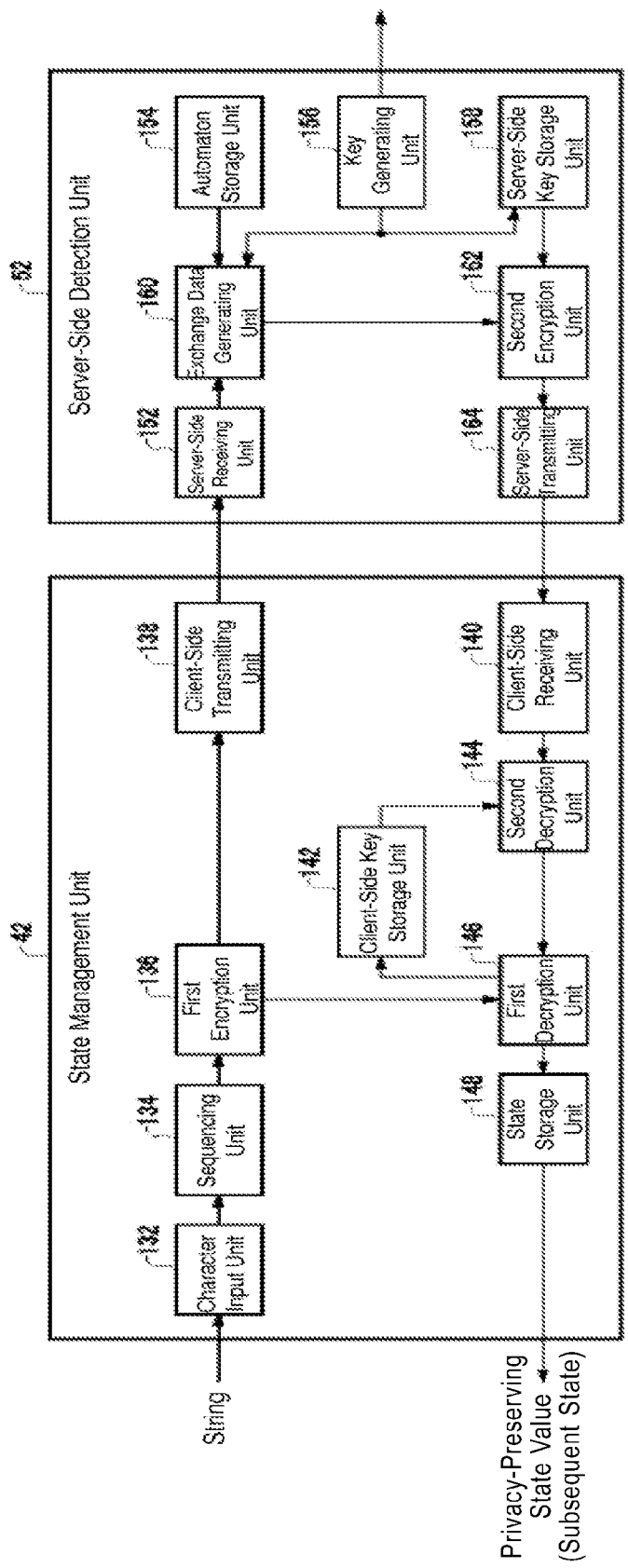
FIG. 8 is a schematic diagram showing the functional block configurations of the state management unit in the client and the server-side detection unit in the server in an embodiment of the present invention.

FIG. 8 shows a functional block configuration of state management unit 42 in client 20 and server-side detection unit 52 in server 30 in an aspect of the present invention. State management unit 42 in client 20 has a character input unit 132, a sequencing unit 134, a first encryption unit 136, a client-side transmitting unit 138, a client-side receiving unit 140, a client-side key storage unit 142, a second decryption unit 144, a first decryption unit 146, and a state storage unit 148. Also, server-side detection unit 52 in server 30 has a server-side receiving unit 152, an automaton storage unit 154, a key generating unit 156, a server-side key storage unit 158, an exchange data generating unit 160, a second encryption unit 162, and a server-side transmitting unit 164.

Character input unit 132 inputs each character included in a string one character at a time beginning with the first character. Sequencing unit 134 generates a sequence in response to a character inputted by character input unit 132 in which one element specifying character is rendered as a non-unity, and in which elements not specifying character are rendered as a unity. A sequence will be explained below in greater detail with reference to FIG. 9.

First encryption unit 136 encrypts elements included in the sequence generated by sequencing unit 134 using a first encryption scheme having homomorphism. A first encryption scheme and coding sequence will be explained in greater detail below with reference to FIG. 9. Client-side transmitting unit 138 associates a coding sequence generated by first encryption unit 136 with a character, and sends associated coding sequence to server-side detection unit 52.

State management unit 42, in response to a character, sends to server-side detection unit 52 a coding sequence in which element identifying the character is a value in which a non-unity has been encrypted using a first encryption scheme having homomorphism, and in which elements not identifying character are values in which a unity has been encrypted using the first encryption scheme.

Server-side receiving unit 152 receives coding sequence from state management unit 42. Automaton storage unit 154 stores an automaton for determining whether or not a string inputted to state management unit 42 has been accepted.

A key generating unit 156 generates a subsequent state key corresponding to subsequent states of automaton in response to each character in the string inputted to state management unit 42. A subsequent state key is explained below in greater detail with reference to FIG. 11.

Server-side key storage unit 158 stores subsequent state keys associated with subsequent states of automaton as previous state keys corresponding previous states when the next character has been inputted. A previous state key is explained below in greater detail with reference to FIG. 11.

Exchange data generating unit 160, in response to receiving a coding sequence, raises each element in received coding sequence to power of subsequent state key corresponding to subsequent state transitioned to from previous state, which corresponds to previous states of the automaton, in response to input of a character specified by an element. Exchange data generating unit 160 generates exchange data in which subsequent state key has been encrypted using first encryption scheme by combining elements raised to the power of subsequent state key using an operation corresponding to the first encryption scheme. The method for generating exchange data will be explained in detail below with reference to FIG. 15.

Second encryption unit 162 encrypts exchange data generated for previous states of automaton using corresponding previous state key. The encryption process of exchange data will be explained in detail below with reference to FIG. 11. In response to receiving a coding sequence, server-side transmitting unit 164 sends encrypted exchange data to state management unit 42.

Server-side detection unit 52, in response to receiving a coding sequence, generates exchange data in which subsequent state key has been encrypted using first encryption scheme based on the coding sequence and in accordance with previous states of the automaton, encrypts exchange data using corresponding previous state key, and sends encrypted exchanged data to state management unit 42.

Client-side receiving unit 140 receives encrypted exchange data from server-side detection unit 52 in response to sending a coding sequence corresponding to a character. Client-side key storage unit 142 stores a single previous state key corresponding to each character in a string. Client-side key storage unit 142 acquires and stores in advance a single previous state key for the first character in the string. In response to receiving each character other than the first character in the string, client-side key storage unit 142 stores as previous state key subsequent state key corresponding to character previously decrypted by first decryption unit 146.

Second decryption unit 144 decrypts encrypted exchange data received by client-side receiving unit 140 using previous state key for the corresponding character stored in client-side key storage unit 142. Second decryption unit 144 can decrypt only one set of exchange data among sets of exchange data when the character is correct.

First decryption unit 146 decrypts subsequent state key using first encryption scheme from one set of exchange data decrypted from among the sets of exchange data by second decryption unit 144. First decryption unit 146 decrypts subsequent state key from one set of exchange data decrypted by second decryption unit 144 using decryption key corresponding to encryption key used in first encryption scheme by first encryption unit 136 to encrypt the elements of the sequence corresponding to the character.

State storage unit 148 stores as privacy-preserving state value subsequent state key decrypted by first decryption unit 146 using the decryption process corresponding to final character in the string. State storage unit 148 sends stored privacy-preserving state value to client-side communication unit 44 when determination process is performed using the privacy-preserving set-intersection protocol.

State management unit 42 in client 20 decrypts in successive order from first character received encrypted exchange data corresponding to the characters. State management unit 42 in client 20 stores decrypted subsequent state key as privacy-preserving state value after exchange data corresponding to the final character has been decrypted.

Figure 9:
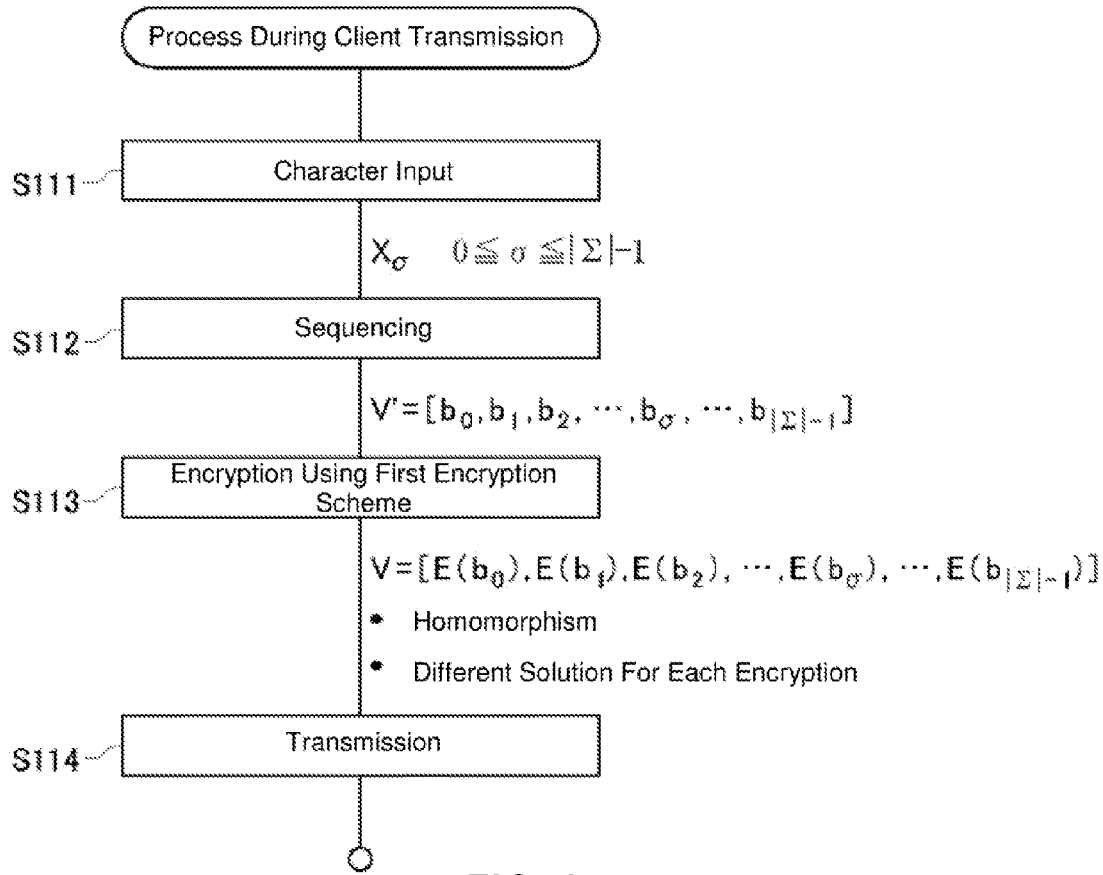
FIG. 9 is a flowchart of the processing performed by the client in an embodiment of the present invention during transmission.
Figure 10:
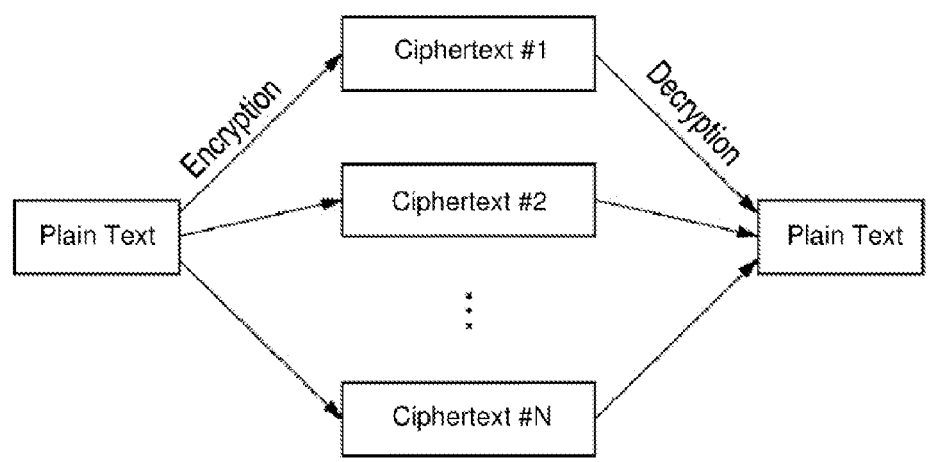
FIG. 10 is an example of ciphertext generated using the first encryption scheme in an embodiment of the present invention.

FIG. 9 shows a flowchart of processing performed during sending by state management unit 42 in client 20 in an aspect of the present invention. FIG. 10 shows an example of ciphertext generated using first encryption scheme.

When a string is inputted, client 20 selects characters in the inputted string one at a time, and executes processing from Step S111 to Step S114 on each of the characters. First, in Step S111, client 20 inputs a character. In an aspect of the present invention, the character $X\sigma$ specified as $\sigma^{th}$ character (index $\sigma$) in set $\Sigma$ of inputtable characters is inputted. For example, when characters are expressed using a single byte, client 20 inputs any character from $0^{th}$ to $255^{th}$. Next, in Step S112, client 20 converts inputted character to sequence V'. Client 20 prepares a sequence including elements for $|\Sigma|$ number of characters in set $\Sigma$ of inputtable characters. For example, when a character expressed by a single byte is inputted, the prepared sequence includes 256 elements.

The prepared sequence has a one-to-one correspondence to characters included in set $\Sigma$. For example, if a character is expressed by single bit (a character expressed by "0" or "1"), there are two elements in sequence, and the first element corresponds to "0" and the second element corresponds to "1".

Client 20 then uses the prepared sequence to generate a sequence in which an element specifying a character inputted by character input unit 132 is a non-unity and elements not specifying one of these characters are unities. A unity is a unity in a binary operation corresponding to first encryption scheme described below. This will be described in greater detail below, but unity is "0" or a unity in an addition operation, and a non-unity is a predetermined numerical value other than "0" (for example, "1") when first encryption scheme is an encryption scheme having additive homomorphism. Unity is "1" or a unity in a multiplication operation, and a non-unity is a predetermined numerical value other than "1" when first encryption scheme is an encryption scheme having a multiplicative homomorphism.

In an aspect of the present invention, first encryption scheme is an encryption scheme having additive homomorphism, as shown in Equation (11) below, client 20 generates coding sequence V' in which element specifying character $X\sigma$ (element $b\sigma$ in index $\sigma$) is "1", and elements not specifying a character (elements other than those of index $\sigma$) are "0".

Equation 7

$$V' = [b_0, b_1, b_2, \ldots, b_\sigma, \ldots, \beta_{|\Sigma|-1}] \quad (11)$$
$$= [0, 0, 0, \ldots, 1, \ldots, 0]$$

(Element Specifying Character points to the middle term; Another Element labels the left and right groups.)

Note that bx represents values of elements in index x included in the sequence. X is an integer within range $0 \leq x \leq (|\Sigma|-1)$. Also, $\sigma$ is index specifying character $X\sigma$ in character set $\Sigma$, and is an integer within range $0 \leq \sigma \leq (|\Sigma|-1)$.

In Step S113, client 20 encrypts using first encryption scheme each of elements included in sequence generated by sequencing unit 134 to generate code sequence V. Client 20 can generate, in accordance with character, a code sequence in which element specifying character is a value obtained by encrypting a non-unit using first encryption scheme and values not specifying character are values obtained by encrypting a unit using the first encryption scheme.

First encryption scheme is a public key encryption scheme satisfying identification difficulties (IND-CPA) with respect to selective plaintext attacks, and having homomorphism (additive homomorphism or multiplicative homomorphism). For example, ciphertext of an encryption scheme having additive homomorphism has characteristics indicated in Equation 4 below.

Also, first encryption scheme, for example, as shown in FIG. 10, is a scheme in which ciphertext is different in each encryption operation even when same ciphertext is encrypted. The first encryption scheme, ciphertext obtained a first time by encrypting a given plaintext using an encryption key is different from ciphertext obtained a second time by encrypting the same plaintext using the same encryption key. However, same plaintext can be decrypted using two ciphertexts obtained the first and second times. Client 20 can eliminate the need to determine whether each element in a sequence is ciphertext obtained by encrypting a unity or ciphertext obtained by encrypting a non-unity.

An encryption scheme known to have these characteristics is an expansion ElGamal encryption scheme. In an aspect of the present invention, client 20 generates coding sequence shown in Equation (13) below using an expansion ElGamal encryption scheme as first encryption scheme.

Equation 8

$$V = [E(b_0), E(b_1), E(b_2), \ldots, E(b_\sigma), \ldots, E(b_{|\Sigma|-1})] \quad (13)$$
$$= [E(0), E(0), E(0), \ldots, E(1), \ldots, E(0)]$$

In other words, in an aspect of the present invention, client 20 generates encrypting sequence V in which element specifying character X$\sigma$ (an element in index a) is ciphertext in which "1" has been encrypted using the expansion ElGamal encryption scheme, and elements not specifying a character (elements other than those of index $\sigma$) are ciphertext in which "0" has been encrypted using expansion ElGamal encryption scheme.

In Step S114, client 20 sends the generated coding sequence to server 30. Client 20 sends a coding sequence in which the order of the characters corresponding to the string is known. For example, client 20 sends the encrypting sequences in the order of the characters. Client 20 can send an encrypting sequence along with an index indicating the order of the characters.

Figure 11:
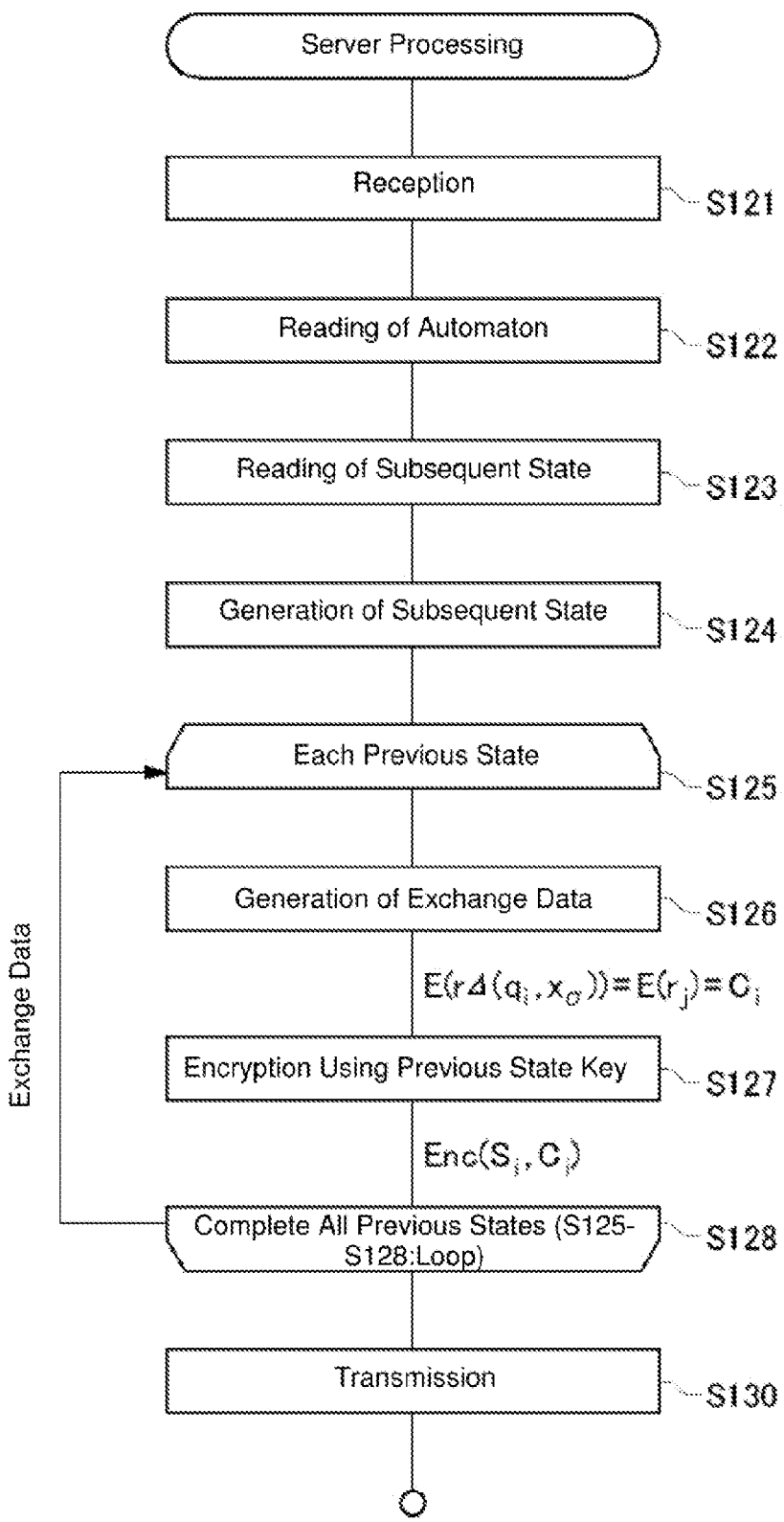
FIG. 11 is a flowchart of the processing performed by the server in an embodiment of the present invention.

FIG. 11 shows a flowchart of processing performed by server 30 in an aspect of the present invention. FIG. 12 shows an example of a transition table for an automaton possessed by server 30 in an aspect of the present invention. FIG. 13 shows a key table including a plurality of previous state keys corresponding to previous states when a certain character is inputted. FIG. 14 shows a key table including a plurality of subsequent state keys corresponding to subsequent states when a certain character is inputted.

In Step S121, server 30 receives a coding sequence corresponding to each character from client 20. Server 30 executes processing from Step S122 to Step S130 on a received coding sequence. Server 30 executes processing from Step S122 to Step S130 on each character in successive order beginning with the coding sequence corresponding to the first character.

For example, server 30 executes processing from Step S122 to Step S130 on the coding sequences in the order received when coding sequences are sent from client 20 in the order of the characters. Also, server 30 executes the processing from Step S122 to Step S130 on the coding sequences in the order of the index when the coding sequences are sent from the client 20 along with an index indicating the order of the characters.

In Step S122, server 30 reads the automaton. Automaton includes a transition table representing state transitions, a group of states, the initial state, and the proper final state. The transition of states performed by the automaton is represented, for example, in the transition table shown in FIG. 12. Server 30 can reference this transition table to identify the next state (subsequent state) to be transitioned to from the current state (previous state) when a given character is provided.

In an aspect of the present invention, automaton has, for example, (|Q|) states represented by q0–q|Q|–1. Also, in the present invention, automaton can accept (|Σ|) characters from x0 to x|Σ|–1. The automaton in the present invention transitions to j$^{th}$ subsequent state qj when $\sigma^{th}$ character x$\sigma$ is provided in i$^{th}$ previous state qi. Integers i and j are between 0 and state number (|Q|–1).

In Step S123, server 30 reads previous state keys corresponding to previous states. In the present invention, server 30, as shown in FIG. 13, is storing previous state keys S0–S|Q|–1 corresponding to previous states q0–q|Q|–1, and retrieves them. These previous state keys are the same as the subsequent state keys for the previous characters, and the values change each time a character is inputted. Previous state key corresponding to the initial character is generated beforehand. In the present invention, server 30 reads previous state key Sj corresponding to i$^{th}$ previous state qi when a character is inputted.

In Step S124, server 30 generates subsequent state keys for each subsequent state. Subsequent state keys are random numbers associated with subsequent states of automaton. In the present invention, server 30, as shown in FIG. 14, generates subsequent state keys r0–r|Q|–1 for each of subsequent states q0–q|Q|–1. These subsequent state keys have values that change each time a character is inputted. In the present invention, for example, server 30 reads subsequent state key rj for the j$^{th}$ subsequent state qj when a character is inputted.

From Step S125 to Step S128, server 30 executes the loop processing for each previous state. In the present invention, server 30 executes processing in Step S126 and Step S127 for each of the previous states q0–q|Q|–1.

In Step S126, server 30 generates exchange data in which a subsequent state key, which corresponds to subsequent state transitioned to from the previous state in response to a character corresponding to coding sequence being inputted, is encrypted using the first encryption scheme. For example, let previous state be qi, and the character corresponding to the received coding sequence be X$\sigma$ (in other words, the received coding sequence is generated from character X$\sigma$). In this case, subsequent state transitioned to in response to character X$\sigma$ being inputted in previous state qi is qj as indicated in FIG. 12. Also, subsequent state key corresponding to subsequent state qj is rj as shown in FIG. 14.

Therefore, server 30, as shown in Equation (14), generates as exchange data Ci ciphertext in which rj is encrypted with the first encryption scheme, when the previous state is qi and the character corresponding to the received coding sequence is X$\sigma$. The method for generating exchange data will be explained in greater detail with reference to FIG. 15.

Equation 9

Exchange Data for Subsquent State $qi$(Subsequent State Key $rj$)=$E(r_j)$=$C_i$ (14)

In Step S127, server 30 encrypts the generated exchange data using corresponding previous state key. Server 30 encrypts exchange data using a private key encryption scheme using a message authentication code (MAC). In the present invention, server 30, for example, encrypts exchange data using a Diffie-Hellman key.

In Step S128, server 30 skips the loop and advances the process to Step S130 when processing in Step S126 and Step S127 has been performed on all of previous states.

In Step S130, server 30 sends to client 20 exchange data generated and encrypted for all of the previous states. Also, server 30 sends to client final state data generated and encrypted for states when coding sequence corresponding to the final character has been received. Server 30 randomly sorts and sends for each coding sequence exchange data encrypted for each of the previous states of the automaton. Also, server 30 sends to client 20 encrypted exchange data so the order of characters associated with received coding sequence is understood. Server 30, for example, sends to client 20 encrypted exchange data to which an index indicating the order of the characters or information identifying corresponding coding sequences has been added.

In the present invention, exchange data $C0-C|Q|-1$ is generated corresponding to previous states $q0-q|Q|-1$. Server 30, as shown in Equation (15), encrypts exchange data $C0-C|Q|-1$ using corresponding previous state key $S0-S|Q|-1$. Enc(x, y) represents encrypting of data y with Diffie-Hellman key x.

Equation 10

$$\begin{aligned} &Enc(S_0, C_0) \\ &Enc(S_1, C_1) \\ &\quad\vdots \\ &Enc(S_i, C_i) \\ &\quad\vdots \\ &Enc(S_{|Q|-1}, C_{|Q|-1}) \end{aligned} \quad (15)$$

When processing of final character in string has been completed, server 30 ends the flow. When processing of a character other than the final character in string has been completed, server 30 in Step S130 stores subsequent state keys $r0-r|Q|-1$ corresponding to subsequent states $q0-q|Q|-1$ as previous state keys for the next character. Server 30 returns to the beginning of the process and executes the process on the coding sequences associated with the next character.

Figure 15:
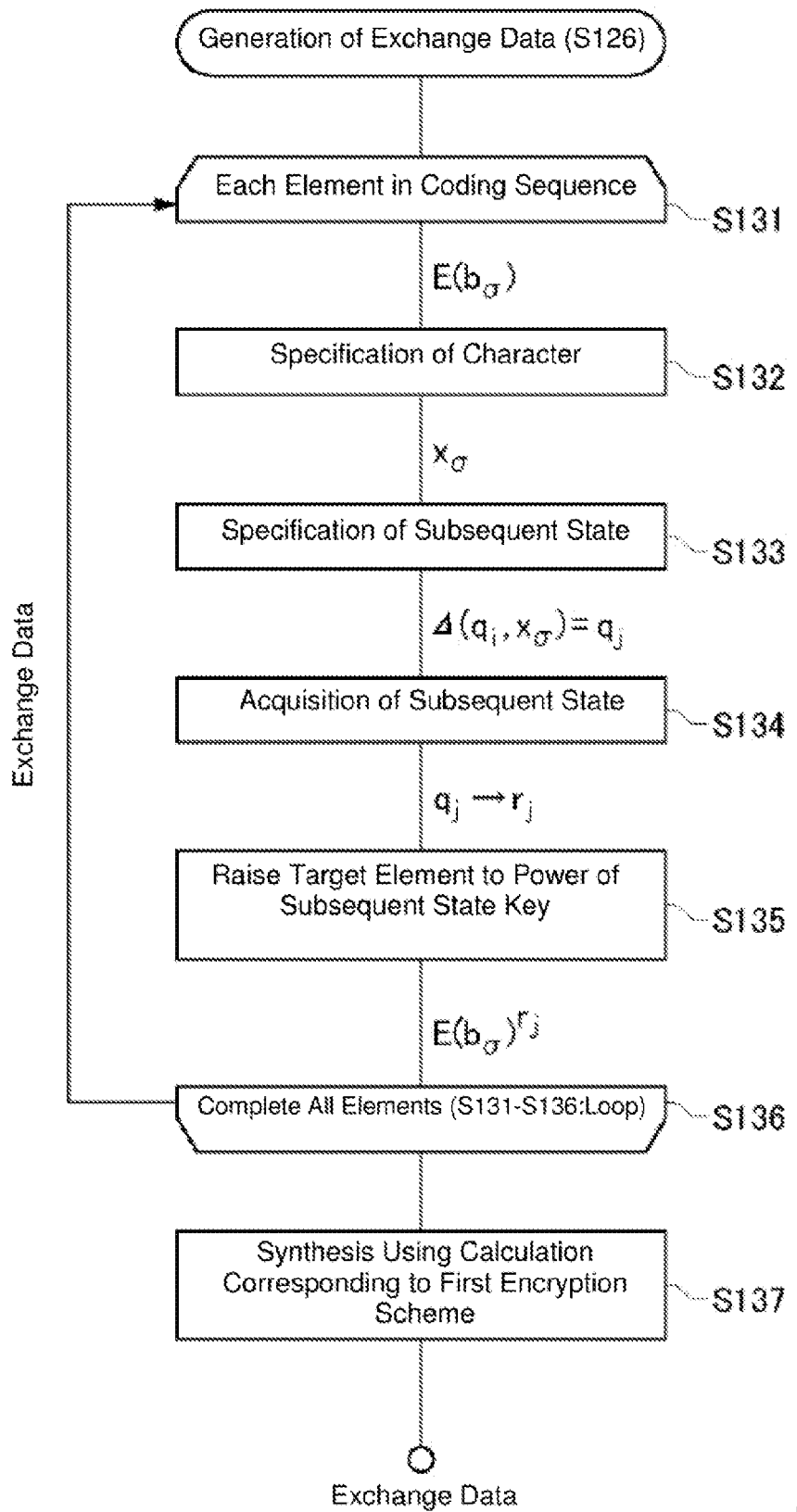
FIG. 15 is a flowchart of the exchange data generating process performed by the server in an embodiment of the present invention.

FIG. 15 shows a flowchart of exchange data generating process performed by server 30 in the present invention. Server 30 executes processing from Step S131 to Step S137 explained below as the exchange data generating process in Step S126 of FIG. 11.

In Step S131 to Step S136, server 30 executes loop processing for each element in the received coding sequence. In the present invention, server 30 executes the processing from Step S132 to Step S135 for each element from $0^{th}$ element to the $(|\Sigma|-1)^{th}$ element.

In Step S132, server 30 specifies the character corresponding to the element to be processed. For example, there are two elements in the coding sequence when a character expressed by a single bit is inputted. For example, server 30 specifies "0" as the character corresponding to the element when the first element in the coding sequence is to be processed, and specifies "1" as the character corresponding to the element when the second element in the coding sequence is to be processed. Here, let server 30 specify character $X\sigma$ corresponding to the $\sigma^{th}$ element.

Next, in Step S133, server 30 specifies the subsequent state to be transitioned to from the previous state in response to the character specified by the element being inputted on the basis of the previous state and specified character to be processed. Let the previous state to be processed by server 30 be qi. Server 30 refers to the transition table for automaton (for example, transition table in FIG. 12), and specifies qj as subsequent state to be transitioned to from previous state qi in response to the input of character $X\sigma$.

In Step S134, server 30 selects from subsequent state keys generated in Step S124 subsequent state key corresponding to specified subsequent state qj. Server 30 selects rj from the table of generated subsequent state keys (for example, table in FIG. 14) as subsequent state key corresponding to subsequent state qj.

In Step S135, server 30 raises target element to the power of\ subsequent state key rj. The $\sigma^{th}$ element $E(b\sigma)$ is raised to the power of subsequent state key rj as shown in Equation (16).

Equation 11

$$E(b_\sigma)^{rj} = E(b_\sigma \times r_j) \quad (16)$$

As a result, because of the characteristics of the first encryption scheme (additive homomorphism), value $(b\sigma \times rj)$ obtained by raising the value $(b\sigma)$ prior to encryption of element using first encryption scheme to power of subsequent state key rj is the same as the ciphertext encrypted using the first encryption scheme.

In Step S136, server 30 skips the loop and advances the process to Step S137 when processing from Step S132 to Step S135 has been performed on all of the elements included in the coding sequence.

In Step S137, server 30 combines the elements raised to the power of subsequent state keys using an operation corresponding to the first encryption scheme. Server 30 uses results of this combination as exchange data corresponding to subsequent state.

In the present invention, first encryption scheme is an encryption scheme having additive homomorphism, so server 30 combines elements raised to the power of subsequent state keys using an addition operation. If the first encryption scheme were an encryption scheme having a multiplicative homomorphism, server 30 would combine elements using a multiplication operation.

As shown in Equation (17), an addition operation is performed on elements from $0^{th}$ element to $(|\Sigma|-1)^{th}$ element to generate exchange data, as in $b0, b1, \ldots, b\sigma, \ldots, b(|\Sigma|-1)$ represent values of the elements before encryption using the first encryption scheme. Also, $r\Delta(q1, x0), r\Delta(q1, x1), \ldots, r\Delta(qi, x\sigma), \ldots, r\Delta(qi, x|\Sigma|-1)$ represent subsequent state keys used to raise the power of the elements.

Equation 12

$$\begin{aligned} \text{Exchange Data} = & \, E(b_0 \times r\Delta(q_i, x_0)) \\ & \cdot E(b_1 \times r\Delta(q_i, x_1)) \\ & \quad \vdots \\ & \cdot E(b_\sigma \times r\Delta(q_i, x_\sigma)) \\ & \quad \vdots \\ & \cdot E(b_{|\Sigma|-1} \times r\Delta(q_i, x_{|\Sigma|-1})) \end{aligned} \quad (17)$$

In the coding sequence, the element specifying character is a value obtained by encrypting a non-unity using first encryption scheme, and elements not specifying character are values obtained by encrypting a unity using first encryption scheme. For example, first encrypting scheme has an additive homomorphism, and the coding sequence V, as shown in Equation (18), includes "1" which is a non-unity of the addition operation for the element $b\sigma$ corresponding to character $X\sigma$, and "0" which is a unity of the addition operation for the elements other than element $b\sigma$ corresponding to character $X\sigma$.

Equation 13

$$\begin{aligned} V &= [E(b_0), E(b_1), E(b_2), \ldots, E(b_\sigma), \ldots, E(b_{|\Sigma|-1})] \\ &= [E(0), E(0), E(0), \ldots, E(1), \ldots, E(0)] \end{aligned} \quad (18)$$

Therefore, when element in Equation (18) are plugged into Equation (17), exchange data is converted as shown in Equation (19) below. All of the elements other than the element corresponding to character Xσ are 0, and the element corresponding to character Xσ is the value of the subsequent state key. As a result, exchange data is ciphertext (E(rj)) in which first encryption scheme has been used to encrypt subsequent state key rj corresponding to subsequent state qj transitioned to from previous state qi in response to the input of character Xσ corresponding to the coding sequence.

Equation 14

$$\text{Exchange Data} = E(0) \cdot E(0) \cdot \ldots \cdot E(r\Delta(q_i, x_\sigma)) \cdot \ldots \cdot E(0) \quad (19)$$
$$= E(r\Delta(q_i, x_\sigma))$$
$$= E(r_j)$$

As described above, server 30 can execute processing from Step S131 to Step S137 to generate exchange data in which first encryption key is used to encrypt subsequent state key corresponding to subsequent state transitioned to from the previous state in response to input of a character corresponding to the coding sequence.

Figure 16:
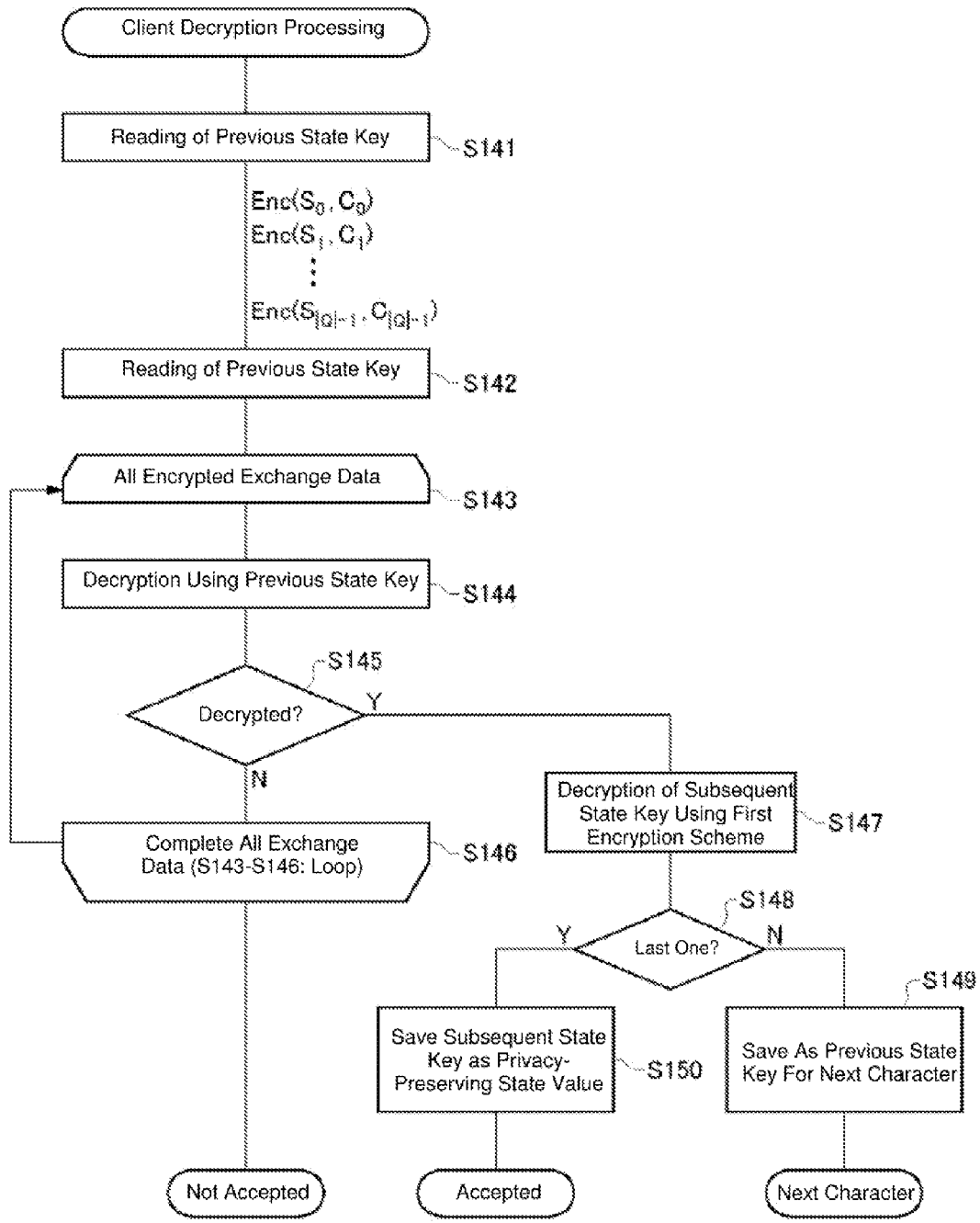
FIG. 16 is a flowchart of the decryption process performed by the client in an embodiment of the present invention.

FIG. 16 shows a flowchart of decryption process performed by client 20 in an aspect of the present invention.

In Step S141, client 20 receives encrypted exchange data from server 30 in response to receiving a coding sequence corresponding to a character included in the string. Also, when coding sequence corresponding to last character in the string is sent, client 20 receives encrypted final state data along with the encrypted exchange data. Client 20 executes processing from Step S142 to Step S150 on the encrypted exchange data that was received. Client 20 executes processing on the encrypted exchange data according to the order of corresponding characters.

In Step S142, client 20 reads and stores previous state key associated with the corresponding character. Client 20, for example, receives from server 30 and stores beforehand previous state key corresponding to first character in the string. Also, client 20 stores subsequent state key corresponding to previous character as previous state key for characters other than the first character in the string.

Client 20 executes loop processing from Step S143 to Step S146 for every set of exchange data. In Step S144, client 20 decrypts the encrypted exchange data to be processed using retrieved previous state key.

Client 20 can decrypt one set of the encrypted exchange data if automaton has transitioned properly to another state when corresponding character has been inputted. If automaton has transitioned properly to another state when corresponding character has been inputted, client 20 cannot decrypt any more of encrypted exchange data.

In Step S145, client 20 determines whether or not exchange data could be decrypted (Step S145). When decryption was possible (Yes in Step S145), client 20 advances process to Step S147. When decryption was not possible (No in Step S145), client 20 advances process to Step S146.

In Step S146, client 20 determines whether or not the processing in Step S144 and Step S145 has ended for all of the exchange data. When processing has still not ended for some of exchange data, client 20 returns process to Step S143, and executes processing from Step S144 to Step S145 on the next set of exchange data. When processing has been ended for all of the exchange data, that is, when some of the exchange data could not be decrypted, client 20 determines that automaton possessed by server 30 could not transition to the proper final state on basis of the inputted string (not accepted), and flow ends.

If exchange data could be decrypted (Yes in Step S145), client 20 in Step S147 further decrypts decrypted exchange data using first encryption scheme to decrypt subsequent state key. Client 20 decrypts subsequent state key in decrypted exchange data using a decryption key corresponding to encryption key used when elements in the coding sequence corresponding to character were encrypted using the first encryption scheme.

In Step S148, client 20 determines whether or not the processing corresponded to final character (Step S148). When it has been determined by client 20 that the processing did not correspond to final character (No in Step S148), processing advances to Step S149. In Step S149, client 20 saves decrypted subsequent state key as the previous state key corresponding to the character. Then, when processing in Step S149 has ended, client 20 repeats processing from Step S141 in order to perform processing corresponding to the next character.

When client 20 has determined that processing corresponds to final character (Yes in Step S149), the process is advanced to Step S150. In Step S150, client 20 stores decrypted subsequent state key as privacy-preserving state value representing state of client 20. When the process in Step S150 has ended, client 20 ends the flow.

Detection system 10 in an aspect of the present invention can acquires a value indicating what state automaton has transitioned to in response to inputted string without disclosing to server 30 string inputted to client 20 and without disclosing to client 20 automaton possessed by server 30. Because the privacy-preserving state value passed to client 20 in detection system 10 of an aspect of the present invention a random number generated by server 30, client 20 can be rendered tamper-proof.

In detection system 10 of the present invention, final subsequent state key of string becomes previous state key of the next string. Therefore, detection system 10 of the present invention, automaton returns each time to its original state, and state of automaton does not have to be successively transitioned. This reduces the processing burden.

Figure 17:
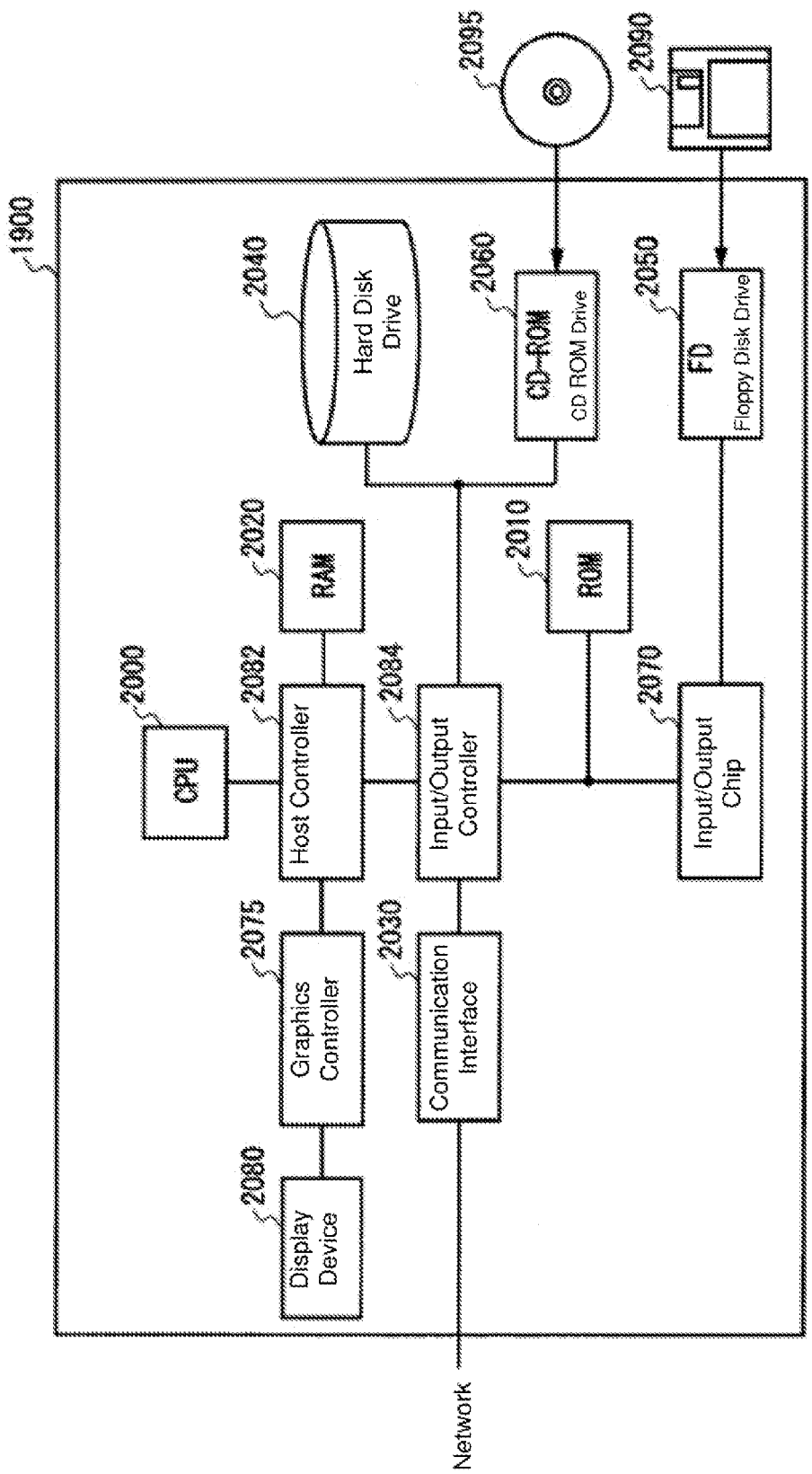
FIG. 17 is an example of the hardware configuration of the computer in an embodiment of the present invention.

FIG. 17 shows an example of hardware configuration of computer 1900 in an aspect of the present invention. Computer 1900 in the present invention is equipped with a CPU peripheral portion having a CPU 2000, RAM 2020, graphics controller 2075 and display 2080 connected to each other by a host controller 2082, an input/output portion having a communication interface 2030, a hard disk drive 2040 and a CD-ROM 2060 connected to the host controller 2082 by an input/output controller 2084, and a legacy input/output portion having a ROM 2010, floppy disk drive 2050, and input/output chip 2070 connected to the input/output controller 2084.

Host controller 2082 is connected to RAM 2020, a CPU 2000 accessing RAM 2020 at a high transfer rate, and a graphics controller 2075. CPU 2000 is operated on the basis of a program stored in ROM 2010 and RAM 2020, and controls the various units. Graphics controller 2075 acquires image data generated in frame buffer of RAM 2020 by CPU 2000 and other units, and displays this image data on display device 2080. Alternatively, graphics controller 2075 can include a frame buffer for storing image data generated by CPU 2000 and other units.

Input/output controller 2084 is connected to a host controller 2082, a communication interface 2030 serving as a relatively high-speed input/output device, a hard disk drive 2040, and a CD-ROM drive 2060. Communication interface 2030 communicates with other devices via a network. Hard disk drive 2040 stores programs and data used by CPU 2000 in computer 1900. CD-ROM drive 2060 reads programs and data from CD-ROM 2095 and provides them to hard disk drive 2040 via RAM 2020.

Input/output controller 2084 is connected to ROM 2010, floppy disk drive 2050, and relatively low-speed input/output device of input/output chip 2070. ROM 2010 stores boot program executed by computer 1900 at startup and/or programs relying on hardware in computer 1900. Floppy disk drive 2050 reads programs or data from a floppy disk drive 2090, and provides programs and data to hard disk drive 2040 via RAM 2020. Input/output chip 2070 connects floppy disk drive 2050 to input/output controller 2084. Various types of input/output device are connected to input/output controller 2084 via a parallel port, serial port, keyboard port, mouse port, etc.

A program provided to hard disk drive 2040 via RAM 2020 is stored on a recording medium such as a floppy disk 2090, CD-ROM 2095 or IC card, and provided by the user. A program is read from recording medium, installed in hard disk drive 2040 inside computer 1900 via RAM 2020, and executed by CPU 2000.

A program installed in a computer 1900 to enable computer 1900 to function as a client 20 includes a state management module and a client-side communication module. These programs or modules are activated by CPU 2000 etc. to enable computer 1900 to function as state management unit 42 and client-side communication unit 44.

Information processing written in these programs are specific means activated by reading programs to computer 1900 so that software cooperates with various types of hardware resources described above. This information processing functions as state management unit 42 and client-side communication unit 44. These specific means realize operations and processing of information in accordance with intended purpose of computer 1900 in an aspect of the present invention to construct a dedicated client 20 for this intended purpose.

A program installed in a computer 1900 to enable computer 1900 to function as a server 30 includes a set storage module, a server-side communication module, and a determining module. These programs or modules are activated by CPU 2000 etc. to enable computer 1900 to function as a set storage unit 46, a server-side communication unit 48, and a determining unit 50.

Information processing written in these programs are specific means activated by reading programs to computer 1900 so that software cooperates with various types of hardware resources described above. This information processing functions as set storage unit 46, server-side communication unit 48, and determining unit 50. These specific means realize operations and processing of information in accordance with intended purpose of computer 1900 in present embodiment to construct a dedicated server 30 for this intended purpose.

For example, when computer 1900 communicates with an external device, CPU 2000 executes communication program loaded in RAM 2020, and instructs communication interface 2030 in communication processing on basis of processing content written in the communication program. Communication interface 2030 is controlled by CPU 2000, and reads transmitted data stored in the transmission buffer region of a memory device such as the RAM 2020, hard disk drive 2040, floppy disk 2090 or CD-ROM 2095, or writes reception data received from network to a reception buffer region of the storage device. Communication interface 2030 transfers transmitted and received data to storage device using direct memory access (DMA) method. Alternatively, CPU 2000 transfers transmitted and received data by reading data from source storage device or communication interface 2030, and writing data to destination communication interface 2030 or storage device.

Also, CPU 2000 writes all of the data or the necessary data to RAM 2020 via, for example, a DMA transfer, from files or databases stored in an external storage device such as a hard disk drive 2040, a CD-ROM drive 2060 (CD-ROM 2095) or a floppy disk drive 2050 (floppy disk 2090), and performs various types of processing on data in RAM 2020. CPU 2000 then writes processed data to the external storage device via, for example, a DMA transfer. Because RAM 2020 temporarily stores contents of external storage device during this process, RAM 2020 and the external storage device are generally referred to in the present embodiment as memory, a storage unit, or a storage device. Various types of information in various types of programs, data, tables and databases of an aspect of the present invention are stored in these memory devices, and are targets of information processing. CPU 2000 can hold some of RAM 2020 in cache memory, and read and write data to cache memory. Cache memory performs some of the functions of RAM 2020. Therefore, this division is excluded in the present invention. Cache memory is included in RAM 2020, memory, and/or storage device.

CPU 2000 also performs various types of processing on data read from RAM 2020 including the operations, processing, condition determination, and information retrieval and replacement described in the present invention and indicated by a sequence of instructions in the program, and writes the results to RAM 2020. For example, when performing a condition determination, CPU 2000 compares various types of variables described in the present invention to other variables or constants to determine whether or not conditions such as large, small, greater than, less than, or equal have been satisfied. When a condition has been satisfied (or not satisfied), the process branches to a different sequence of instructions or calls up a subroutine.

CPU 2000 can also retrieve information stored in files or databases inside the memory device. For example, when a plurality of entries associating an attribute value for a second attribute to an attribute value for a first attribute, CPU 2000 can retrieve an entry matching conditions indicated by the attribute value of the first attribute among the plurality of entries stored in the storage device, and then obtain the attribute value of the second value associated with the first value satisfying a predetermined condition by reading the attribute value of the second attribute stored in the entry.

A program or module described above can be stored in a recording medium of an external unit. Instead of a floppy disk 2090 or a CD-ROM 2095, recording medium can be an optical recording medium such as a DVD or CD, a magneto-optical recording medium such as MO, a tape medium, or a semiconductor memory such as an IC card. Recording medium can also be a storage device such as a hard disk or RAM provided in a server system connected to a dedicated communication network or the internet, and the program can be provided to computer 1900 via the network.

The present invention was explained using an aspect, but the technical scope of the present invention is not limited to the aspects described above. The possibility of many changes and improvements to this invention should be apparent to those skilled in the art. Aspects including these changes and improvements are within the technical scope of the present invention, as should be clear from the description of the claims.

The order of execution for operations, steps and processes in the devices, systems, programs and methods described in the claims, description, and drawings was described using such terms as "previous" and "prior." However, these operations, steps and processes can be realized in any order as long as the output of the previous process is used by the subsequent process. The operational flow in the claims, description and drawing were explained using terms such as "first" and "next" for the sake of convenience. However, the operational flow does not necessarily have to be executed in this order.

The invention claimed is:

1. A server connectable to a client, the server comprising:
at least one processor;
a memory comprising a computer readable program and a set of a plurality of predetermined states;
wherein the at least one processor, in response to execution of the computer readable program, causes the server to perform the following;
communicating with the client using a privacy-preserving set-intersection protocol for detecting whether an element in a mutual set is a common element between mutual sets while preserving privacy, wherein the mutual set corresponds to the set of the plurality of predetermined states, wherein the communicating using the privacy-preserving set-intersection protocol comprises:
receiving ciphertext received in accordance with the privacy-preserving set-intersection protocol; and
determining, based on the received ciphertext, whether a state of the client is included in the set of the plurality of predetermined states stored by the memory.

2. The server of claim 1, wherein the communicating using the privacy-preserving set-intersection protocol further comprises:
sending ciphertext in accordance with the privacy-preserving set-intersection protocol, the sent ciphertext allowing the client to determine whether the state of the client is included in the set stored by the memory.

3. The server of claim 2, wherein the communicating using the privacy-preserving set-intersection protocol further comprises:
receiving from the client the sent ciphertext encrypting, using an encryption scheme having homomorphism, each coefficient of a polynomial having as a solution a value representing each of the plurality of states of the client; and
decrypting the response ciphertext from the client;
generating response ciphertext encrypting, using the encryption scheme having homomorphism, results from substituting values representing a plurality of states of the client in the variable of the polynomial on the basis of the sent ciphertext and the values representing the states included in the set stored by the memory; and
sending the response ciphertext to the client, whereby to the client can determine from the decrypted results of the response ciphertext whether the state of the client is included in the set stored by the memory of the server.

4. The server of claim 1, wherein the received ciphertext is first ciphertext, and wherein the communicating using the privacy-preserving set-intersection protocol further comprises: after determining that the state of the client is included in the set for the first ciphertext, receiving second ciphertext and determining using the privacy-preserving set-intersection protocol whether the state of the client is included in the set, wherein the second ciphertext is received in response to at least one transition occurring in the state of the client.

5. The server of claim 4, wherein the at least one processor, in response to execution of the computer readable program, causes the server to perform the following:

transitioning, using an implemented automaton, state in response to an inputted event, and sending to the client a privacy-preserving state value representing the transitioned-to state without disclosing the automaton to the client; and
storing in the memory at least a portion of a plurality of privacy-preserving state values corresponding to a plurality of states in the automaton as states included in the set.

6. The server of claim 1, wherein the communicating using the privacy-preserving set-intersection protocol further comprises:
sending to the client sent ciphertext encrypting, using an encryption scheme having homomorphism, each coefficient of a polynomial having as a solution a value representing each of the plurality of states included in the set;
receiving from the client response ciphertext encrypting, using the encryption scheme having homomorphism, a result from substituting a value representing the state of the client in a variable of the polynomial on the basis of the sent ciphertext and a value representing the state of the client;
decrypting the response ciphertext; and
determining whether the state of the client is included in the set stored by the memory from the decryption results of the response ciphertext.

7. The server of claim 1, wherein the communicating using the privacy-preserving set-intersection protocol further comprises:
detecting occurrence of an abnormality in the client in response to the state of the client being included in the set stored by the set storage unit in the server.

8. A client connectable to a server the client comprising:
at least one processor;
a memory comprising a computer readable program;
wherein the at least one processor, in response to execution of the computer readable program, causes the client to perform the following:
managing successively transitioning states of the client;
communicating with the server using a privacy-preserving set-intersection protocol for detecting whether an element in a mutual set is a common element between mutual sets while preserving privacy, wherein the mutual set corresponds to the states and to a set of predetermined states stored on the server, and wherein the communicating using the privacy-preserving set-intersection protocol comprises; and
receiving ciphertext from the server in accordance with the privacy-preserving set-intersection protocol and
determining, using the received ciphertext, whether a state of the client is included in the set stored by the server.

9. The client of claim 8, wherein the communicating using the privacy-preserving set-intersection protocol comprises:
sending ciphertext in accordance with the privacy-preserving set-intersection protocol in order to determine whether the state of the client is included in the set stored by the set storage unit.

10. The client of claim 9, wherein the sent ciphertext is first ciphertext, and wherein the communicating using the privacy-preserving set-intersection protocol comprises:
transitioning to another state after determining whether the state of the client is included in the set, and sending second ciphertext in accordance with the privacy-preserving set-intersection protocol to the server, the sent ciphertext allowing the client to determine whether the transitioned-to state of the client is included in the stored set.

11. A method for a server connectable to a client, the method comprising:
    storing in a memory a set of a plurality of predetermined states;
    communicating with the client using a privacy-preserving set-intersection protocol for detecting whether an element in a mutual set is a common element between mutual sets while preserving privacy, wherein the mutual set corresponds to the set of the plurality of predetermined states, wherein the communicating using the privacy-preserving set-intersection protocol comprises:
    receiving ciphertext received in accordance with the privacy-preserving set-intersection protocol; and
    determining, based on the received ciphertext, whether a state of the client is included in the set of the plurality of predetermined states stored by the memory.

12. The method as claimed in claim 11, wherein the communicating using the privacy-preserving set-intersection protocol further comprises:
    sending ciphertext in accordance with the privacy-preserving set-intersection protocol, the sent ciphertext allowing the client to determine whether the state of the client is included in the stored set.

13. The method of claim 12, wherein the communicating using the privacy-preserving set-intersection protocol further comprises:
    receiving from the client the sent ciphertext encrypting, using an encryption scheme having homomorphism, each coefficient of a polynomial having as a solution a value representing each of the plurality of states of the client; and
    decrypting the response ciphertext from the client;
    generating response ciphertext encrypting, using the encryption scheme having homomorphism, results from substituting values representing a plurality of states of the client in the variable of the polynomial on the basis of the sent ciphertext and the values representing the states included in the set stored by the memory; and
    sending the response ciphertext to the client, whereby the client can determine from the decrypted results of the response ciphertext whether the state of the client is included in the set stored by the memory of the server.

14. A computer program product comprising a computer readable medium having program instructions embodied therewith, wherein the program instructions enable a computer to cause a server to perform the method according to claim 11.

15. The method of claim 11, wherein the received ciphertext is first ciphertext, and wherein the communicating using the privacy-preserving set-intersection protocol further comprises: after determining that the state of the client is included in the set for the first ciphertext, receiving second ciphertext and determining using the privacy-preserving set-intersection protocol whether the state of the client is included in the set, wherein the second ciphertext is received in response to at least one transition occurring in the state of the client.

16. The method of claim 15, further comprising:
    transitioning, using an implemented automaton, state in response to an inputted event, and sending to the client a privacy-preserving state value representing the transitioned-to state without disclosing the automaton to the client; and
    storing in the memory at least a portion of a plurality of privacy-preserving state values corresponding to a plurality of states in the automaton as states included in the set.

17. The method of claim 11, wherein the communicating using the privacy-preserving set-intersection protocol further comprises:
    sending to the client sent ciphertext encrypting, using an encryption scheme having homomorphism, each coefficient of a polynomial having as a solution a value representing each of the plurality of states included in the set;
    receiving from the client response ciphertext encrypting, using the encryption scheme having homomorphism, a result from substituting a value representing the state of the client in a variable of the polynomial on the basis of the sent ciphertext and a value representing the state of the client;
    decrypting the response ciphertext; and
    determining whether the state of the client is included in the set stored by the memory from the decryption results of the response ciphertext.

18. The method of claim 11, wherein the communicating using the privacy-preserving set-intersection protocol further comprises: detecting occurrence of an abnormality in the client in response to the state of the client being included in the set stored by the set storage unit in the server.

19. The client of claim 18, wherein the wherein the at least one processor, in response to execution of the computer readable program, further causes the client to perform the following:
    inputting an event generated by the client to the server;
    acquiring from the server a privacy-preserving state value preserving the privacy of the client, the value representing a transitioned-to state in response to the inputted event without disclosing the inputted event to the server; and
    managing the acquired privacy-preserving state value as the state of the client.

20. The client of claim 11, wherein the communicating using the privacy-preserving set-intersection protocol comprises:
    receiving from the server sent ciphertext encrypting, using an encryption scheme having homomorphism, each coefficient of a polynomial having as a solution a value representing each of the plurality of states included in the set;
    sending response ciphertext encrypting, using the encryption scheme having homomorphism, a result from substituting a value representing the state of the client in a variable of the polynomial on the basis of the sent ciphertext and a value representing the state of the client, whereby the response ciphertext allows the server to determine whether the state of the client is included in the set stored by the set storage unit in the server from the decryption results of the response ciphertext.

* * * * *